United States Patent
Tanaka et al.

(10) Patent No.: US 6,908,872 B2
(45) Date of Patent: Jun. 21, 2005

(54) TRANSPARENT CERAMIC AND METHOD FOR PRODUCTION THEREOF, AND OPTICAL ELEMENT

(75) Inventors: Nobuhiko Tanaka, Hirakata (JP); Yukio Higuchi, Omihachiman (JP); Masayoshi Katsube, Omihachiman (JP); Mitsuru Sube, Yokaichi (JP)

(73) Assignee: Murata Manufacturing Co. Ltd (JP)

( * ) Notice: Subject to any disclaimer, the term of this patent is extended or adjusted under 35 U.S.C. 154(b) by 0 days.

(21) Appl. No.: 10/204,642
(22) PCT Filed: Dec. 18, 2001
(86) PCT No.: PCT/JP01/11096
  § 371 (c)(1),
  (2), (4) Date: Nov. 1, 2002
(87) PCT Pub. No.: WO02/49984
  PCT Pub. Date: Jun. 27, 2002

(65) Prior Publication Data
US 2003/0181311 A1 Sep. 25, 2003

(30) Foreign Application Priority Data
Dec. 20, 2000 (JP) ........................ 2000-387730

(51) Int. Cl.$^7$ .................. C04B 35/48; C04B 35/495
(52) U.S. Cl. ................... 501/135; 385/131; 385/147
(58) Field of Search ................. 501/134–139; 385/131, 147

(56) References Cited

U.S. PATENT DOCUMENTS

| 4,019,915 A | * | 4/1977 | Miyauchi et al. ........... 501/135 |
| 4,131,479 A | | 12/1978 | Ichinose et al. |
| 5,109,156 A | * | 4/1992 | Evans et al. ................ 257/84 |
| 5,239,399 A | * | 8/1993 | Evans et al. ............... 398/200 |
| 5,242,707 A | * | 9/1993 | Esener et al. ............ 427/126.3 |
| 5,578,845 A | * | 11/1996 | Masuda et al. ............. 257/295 |
| 5,614,129 A | * | 3/1997 | Hofmeister et al. ........ 252/584 |
| 5,785,898 A | * | 7/1998 | Hofmeister et al. ........ 252/584 |
| 6,207,082 B1 | * | 3/2001 | Suzuki et al. .......... 252/519.13 |
| 6,403,053 B1 | * | 6/2002 | Fang et al. ............... 423/594.8 |
| 2003/0124360 A1 | | 7/2003 | Reihs et al. |

FOREIGN PATENT DOCUMENTS

| JP | 49-37913 | 2/1974 |
| JP | 53-92811 | 8/1978 |

(Continued)

OTHER PUBLICATIONS

Translation of Japanase document 7–082025, Mar. 28, 1995.*
European Search Reported dated May 12, 2004.
International Search Reported dated Mar. 12, 2002.

(Continued)

Primary Examiner—Karl Group
(74) Attorney, Agent, or Firm—Dickstein, Shapiro, Morin & Oshinsky, L.L.P.

(57) ABSTRACT

A ceramic material powder for a translucent ceramic is molded with a binder, and the resulting green compact is embedded in a ceramic powder having the same composition with the ceramic material powder. After removing the binder, the green compact embedded in the ceramic powder is fired in an atmosphere having an oxygen concentration higher than that in the removal procedure of the binder and thereby yields a translucent ceramic represented by Formula I: $Ba\{(Sn_uZr_{1-u})_xMg_yTa_z\}_vO_w$, Formula II: $Ba(Zr_xMg_yTa_z)_vO_w$ or Formula III: $Ba\{(Sn_uZr_{1-u})_xZn_tMg_{1-t})_yNb_z\}_vO_w$. The translucent ceramic has a refractive index of 1.9 or more and is paraelectric.

44 Claims, 31 Drawing Sheets

RELATIONSHIP BETWEEN TRANSMITTANCE AND WAVELENGTH

FOREIGN PATENT DOCUMENTS

| | | |
|---|---|---|
| JP | 62-237694 | 10/1987 |
| JP | 2-98092 | 4/1990 |
| JP | 05-1074767 | 4/1993 |
| JP | 7-82025 | 3/1995 |
| JP | 8-187461 | 7/1996 |
| JP | 08-052783 | 9/1997 |
| JP | 11-167075 | 6/1999 |
| JP | 2000-131658 | 5/2000 |
| JP | 2000-205941 | 7/2000 |
| WO | WO 01/92179 A1 | 12/2001 |

OTHER PUBLICATIONS

Electronic structure, chemical bonding, and optical properties of paraelectric BaTiO$_3$: Sonali Saha and T.P. Sinha, *Physical Review* B, vol. 62, No. 13; Oct. 2000.

Prediction of the Dielectric Properties of Non–Ferroelectric Complex Perovskitbs and of the Ternary System; Eli Colla, N. David, C. Rau and N. Setter, *Ferroelectrics*, 1996, vol. 184, pp. 151–160.

Korean Office Action received Sep. 25, 2004.

\* cited by examiner

RELATIONSHIP BETWEEN
LINEAR TRANSMITTANCE
AND WAVELENGTH

WAVELENGTH

MEASURED REFRACTIVE INDEX

RELATIONSHIP BETWEEN
LINEAR TRANSMITTANCE
AND WAVELENGTH

FIRING

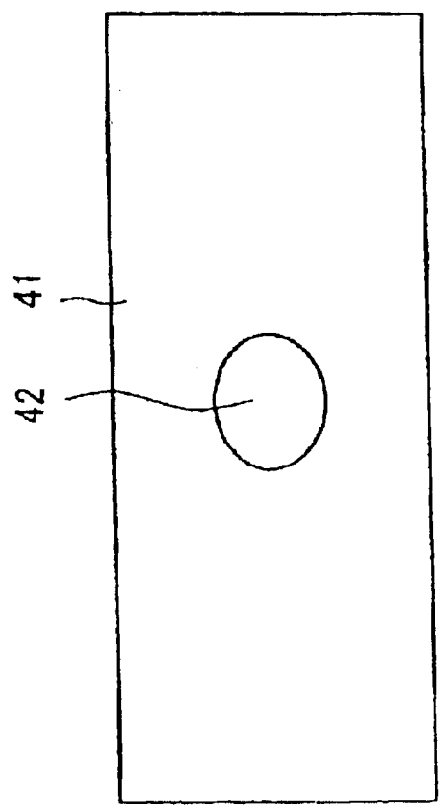
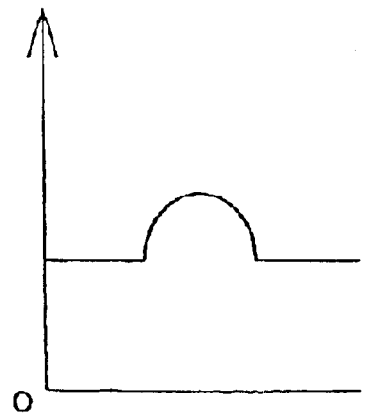
FIG. 24A
FIG. 24B
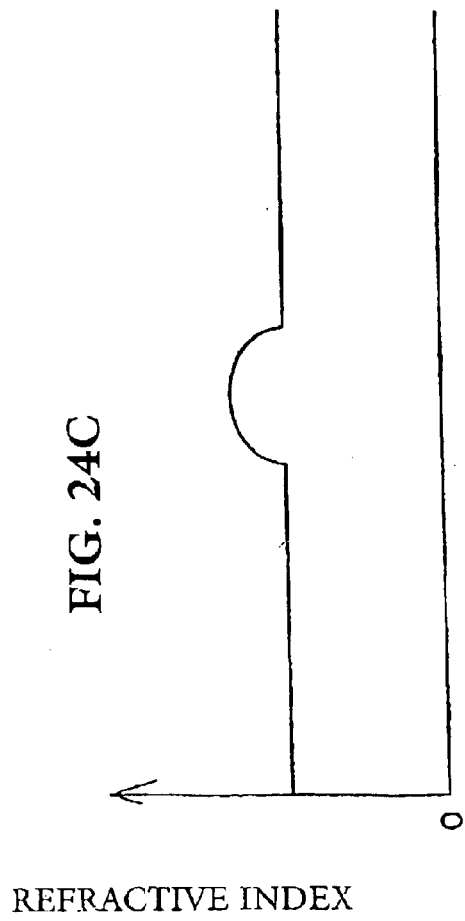
FIG. 24C

TRANSPARENT CERAMIC AND METHOD FOR PRODUCTION THEREOF, AND OPTICAL ELEMENT

TECHNICAL FIELD

The present invention relates to a translucent ceramics having a high refractive index and exhibiting paraelectricity, a method of producing the same, and an optical device using the translucent ceramic.

BACKGROUND ART

Conventional materials for optical parts of optical devices are glass, plastics and single crystals of, for example, lithium niobate ($LiNbO_3$) as described in Japanese Unexamined Patent Application Publication Nos. 5-107467 and No. 9-245364.

Such glass and plastics have a high light transmittance, can easily be processed into devices and are used as optical parts such as lenses. The single crystalline $LiNbO_3$ has some electrochemical properties and exhibits double refraction and is used as an optical part such as an optical waveguide utilizing these properties. Demands have been made on further miniaturized or slimmed optical pickups and other optical devices using these optical parts.

However, the conventional glass has a refractive index less than 1.9, and the resulting optical parts and optical devices using the same have the limitations in miniaturization and slimming. The plastics have low moisture resistance and a low refractive index, exhibit double refraction and cannot efficiently transmit and condense incident light. The single crystals of, for example, $LiNbO_3$ have a high refractive index of, for example, 2.3 but exhibit double refraction, are difficult to use as the optical parts such as lenses and have the limitations in their application.

DISCLOSURE OF INVENTION

To solve the above problems, the present invention provides a translucent ceramic which has a refractive index of equal to or more than 1.9 and is a paraelectric.

The term "paraelectric" as used herein means a substance that does n t substantially change in its dielectric constant and invites no double refraction, even when electric field is applied thereto. Specifically, the translucent ceramic of the present invention is paraelectric and polycrystalline and thereby induces no double refraction. Accordingly the translucent ceramic can widely be applied to various applications and can be applied to the optical parts such as lenses, as compared with the single crystals exhibiting double refraction. In addition, the translucent ceramic has a refractive index of equal to or more than 1.9, can be processed into an optical part having a relatively small size and thereby enables the miniaturization of the resulting optical part.

In addition, the translucent ceramic of the present invention is a ceramic and has higher moisture resistance than the plastics. The term "translucent ceramic" as used in the present invention means a translucent (preferably, having a linear transmittance of light of equal to or more than 20%) polycrystal (a dense aggregate of a plurality of crystal grains).

The present invention further provides a method of producing a translucent ceramic. The method includes the steps of molding a ceramic material powder and a binder into a predetermined shape to thereby yield a ceramic green compact, bringing the ceramic green compact into contact with a ceramic powder having substantially the same composition with the ceramic material powder, and firing the ceramic green compact in contact with the ceramic powder to thereby yield a translucent ceramic.

According to the method of producing a translucent ceramic of the present invention, the green compact prepared by molding the ceramic material powder and the binder is brought into contact with the ceramic powder having substantially the same composition with the ceramic material powder and is then fired. This procedure can prevent volatile components in the ceramic green compact from evaporating during firing and can yield a translucent ceramic which exhibits less variation in its composition, has a refractive index of equal to or more than 1.9 and is paraelectric.

The phrase "a ceramic powder having substantially the same composition with the ceramic material powder" as used herein means a ceramic powder containing an element similar to at least one of plural elements (excluding oxygen) constituting the ceramic material powder for the formation of the translucent ceramic. The ceramic powder preferably contains all the plural elements constituting the ceramic material powder.

In addition and advantageously, the present invention provides an optical device including the translucent ceramic of the present invention as an optical part.

Specifically, the translucent ceramic of the present invention has a refractive index of equal to or more than 1.9 and is paraelectric, can therefore improve the optical properties of an optical device using the translucent ceramic as an optical part such as a lens, prism or optical path control plate and can miniaturize the resulting optical device.

BRIEF DESCRIPTION OF THE DRAWINGS

FIGS. 24A, 24B, and 24C are a schematic representation, a graph and a graph, respectively, showing the refractive index distribution when seen from the front, in a thickness direction, and in a width direction, respectively, of the optical waveguide according to Third Application Embodiment of the present invention.

BEST MODE FOR CARRYING OUT THE INVENTION

The translucent ceramic of the present invention has a refractive index of equal to or more than 1.9 and is paraelectric. The translucent ceramic is a polycrystalline dense aggregate of crystal grains. Specifically, it contains pores inside or between grains in very small amounts of less than or equal to 0.1% (or less than or equal to 0.01%) in terms of area ratio and includes very small amounts of foreign matters.

Consequently, the translucent ceramic of the present invention has satisfactory optical properties. For example, it can yield a linear transmittance with respect to light of equal to or more than 20%, typically equal to or more than 50%, has a refractive index of equal to or more than 1.9, typically equal to or more than 2.0 and further typically equal to or more than 2.1 and exhibits no double refraction.

The translucent ceramic typically comprises, as a principle crystal phase, a polycrystalline oxide composed of a perovskite crystal phase represented by the formula: $ABO_3$ wherein A is an A-site element of the perovskite crystal phase; and B is a B-site element of the perovskite crystal phase. Such perovskite crystal phases also include composite perovskite crystal phases.

The perovskite crystal phases represented by the formula $ABO_3$ include, as a perovskite crystal phase having the first composition according to the present invention, a $Ba(Mg, Ta)O_3$ system composite perovskite crystal phase containing barium as the A-site element and magnesium and tantalum as the B-site elements. Preferably, the perovskite crystal phase having the first composition according to the present invention is a $Ba\{(Sn,Zr)(Mg,Ta)\}O_3$ system composite perovskite crystal phase further comprising tin and zirconium as the B-site elements in addition to the aforementioned composition.

When the perovskite crystal phase having the first composition according to the present invention is represented by:

$$Ba\{(Sn_uZr_{1-u})_xMg_yTa_z\}_vO_w \qquad \text{Formula I}$$

wherein x+y+z=1, $0 \leq u \leq 1.00$, $1.00 \leq v \leq 1.05$; and w is arbitrary, x, y, and z preferably lie within the range enclosed by Point A (x=0.40, y=0.23, z=0.37), Point B (x=0, y=0.39, z=0.61), Point C (x=0, y=0.27, z=0.73), and Point D (x=0.40, y=0.11, z=0.49), excluding the line between Point A and Point B.

Figure 1:
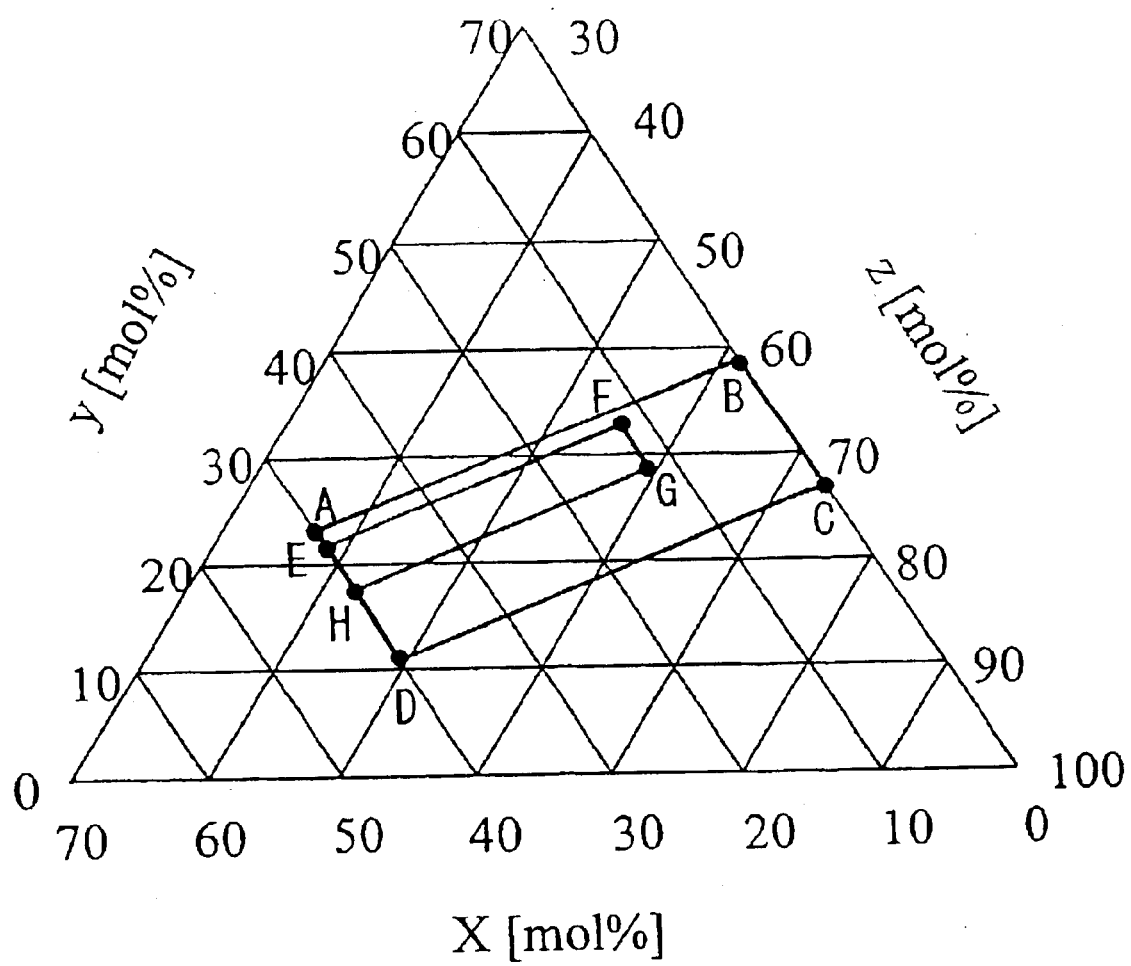
FIG. 1 is a ternary composition diagram of a $Ba\{(Sn_u Zr_{1-u})_x Mg_y Ta_z\}_v O_w$ system translucent ceramic of the present invention.

FIG. 1 is a ternary composition diagram showing the compositional range of x, y, and z in the composite perovskite crystal phase represented by Formula I: $Ba\{(Sn_uZr_{1-u})_x$  $Mg_yTa_z\}_vO_w$, wherein x+y+z=1, $0 \leq u \leq 1.00$, $1.00 \leq v \leq 1.05$; and w is an arbitrary number.

In FIG. 1, a translucent ceramic having a composition within the range enclosed by the square ABCD formed by connecting Point A (0.40, 0.23, 0.37), Point B (0, 0.39, 0.61), Point C (0, 0.27, 0.73), and Point D (0.40, 0.11, 0.49), including the lines BC, CD and DA and excluding the line AB, has a high linear transmittance of equal to or more than 20% and a high refractive index of equal to or more than 2.0 and typically about 2.07.

More preferably, x, y, and z in Formula I lie within the range enclosed by Point E (x=0.400, y=0.210, z=0.390), Point F (x=0.125, y=0.325, z=0.550), Point G (x=0.125, y=0.290, z=0.585), and Point H (x=0.400, y=0.170, z=0.430).

The translucent ceramic having a composition within the range enclosed by the square EFGH formed by connecting Point E (0.400, 0.210, 0.390), Point F (0.125, 0.325, 0.550), Point G (0.125, 0.290, 0.585), and Point H (0.400, 0.170, 0.430), including the lines connecting each point, has a high linear transmittance of equal to or more than 50% and a high refractive index of about 2.07.

The translucent ceramic having the first composition according to the present invention exhibits high optical properties in linear transmittance and refractive index, is paraelectric and exhibits no double refraction, as described in detail below.

The perovskite crystal phases represented by the formula $ABO_3$ further include, as a perovskite crystal phase having the second composition according to the present invention, a $Ba(Zn,Ta)O_3$ system composite perovskite crystal phase containing barium as the A-site element and zinc and tantalum as the B-site elements. Preferably, the perovskite crystal phase having the second composition according to the present invention is a $Ba\{(Zr,Zn,Ta)\}O_3$ composite perovskite crystal phase further comprising as the B-site element in addition to the aforementioned composition.

When the perovskite crystal phase having the second composition according to the invention is

$$Ba(Zr_xZn_yTa_z)_vO_w \qquad \text{Formula II.}$$

wherein x+y+z=1, $0\leq u\leq 1.00$, $1.00\leq v\leq 1.050$; and w is arbitrary, x, y, and z preferably lie within the range enclosed by Point A (x=0.01, y=0.29, z=0.70), Point B (x=0.06, y=0.29, z=0.65), Point C (x=0.06, y=0.36, z=0.58), and Point D (x=0.01, y=0.36, z=0.63).

Figure 2:
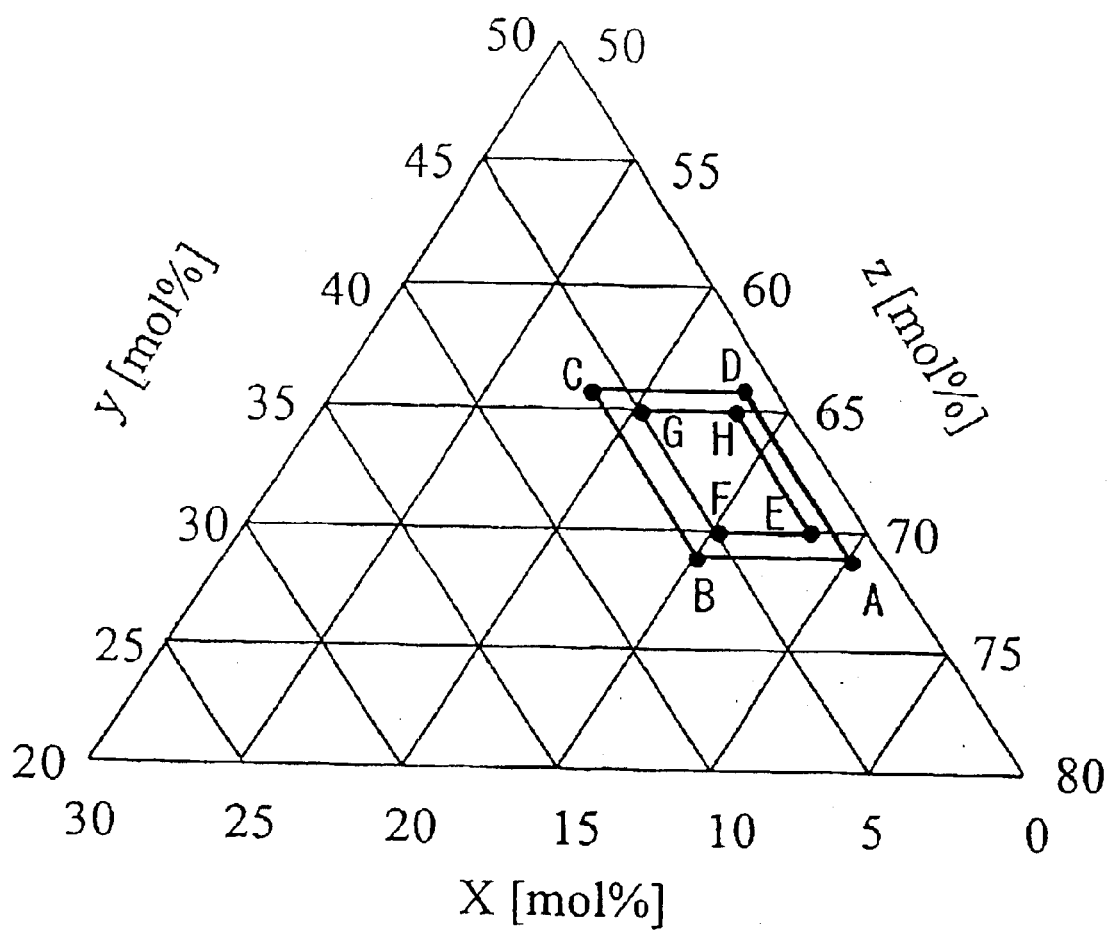
FIG. 2 is a ternary composition diagram of the $Ba(Zr_x Zn_y Ta_z)_v O_w$ system translucent ceramic of the present invention.

FIG. 2 is a ternary composition diagram showing the compositional range of x, y, and z in the composite perovskite crystal phase represented by Formula II: $Ba(Zr_xZn_yT_z)_vO_w$, wherein x+y+z=1, $0\leq u\leq 1.00$, $1.00\leq v\leq 1.050$; and w is arbitrary.

In FIG. 2, a translucent ceramic having a composition within the range enclosed by the square ABCD formed by connecting (0.01, 0.29, 0.70), Point B (0.06, 0.29, 0.65), Point C (0.06, 0.36, 0.58), and Point D (0.01, 0.36, 0.63), including the lines connecting each point, has a high linear transmittance of equal to or more than 20% and a high refractive index of equal to or more than 2.0 and typically about 2.1.

More preferably, x, y, and z in Formula II lie within the range enclosed by Point E (x=0.020, y=0.300, z=0.680), Point F(x=0.050, y=0.300, z=0.650), Point G (x=0.050, y=0.350, z=0.600), and Point H (x=0.020, y=0.350, z=0.630).

The translucent ceramic having a composition within the range enclosed by the square EFGH formed by connecting Point E (0.020, 0.300, 0.680), Point F (0.050, 0.300, 0.650), Point G (0.050, 0.350, 0.600), and Point H (0.020, 0.350, 0.630), including the lines connecting each point, has a high linear transmittance of equal to or more than 50% and a high refractive index of about 2.1.

The translucent ceramic having the second composition according to the present invention exhibits high optical properties in linear transmittance and refractive index, is paraelectric and invites no double refraction, as described in detail below, as in the translucent ceramic having the first composition according to the present invention.

The perovskite crystal phases represented by the formula: $ABO_3$ further include, as a perovskite crystal phase having the third composition according to the present invention, a $Ba(Mg, Nb)O_3$ system composite perovskite crystal phase containing barium as the A-site element and magnesium and niobium as the B-site elements. Preferably, the perovskite crystal phase having the third composition according to the present invention is a $Ba\{(Sn,Zr)(Zn,Mg)Nb\}O_3$ composite perovskite crystal phase further comprising zirconium as the B-site element in addition to the aforementioned composition.

When the perovskite crystal phase having the third composition according to the present invention is represented by:

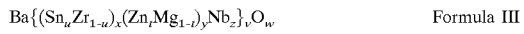

$$Ba\{(Sn_uZr_{1-u})_x(Zn_tMg_{1-t})_yNb_z\}_vO_w \qquad \text{Formula III}$$

wherein x+y+z=1, $0\leq t\leq 1.00$, $0\leq u\leq 1.00$, $1.00\leq v\leq 1.450$; and w is arbitrary, x, y, and z preferably lie within the range enclosed by Point A (x=0.25, y=0.35, z=0.40), Point B (x=0, y=0.35, z=0.65), Point C (x=0, y=0.20, z=0.80), Point D (x=0.10, y=0.10, z=0.80), Point E (x=0.55, y=0.10, z=0.35), Point F (x=0.35, y=0.30, z=0.35), and Point G (x=0.30, y=0.30, z=0.40).

Figure 3:
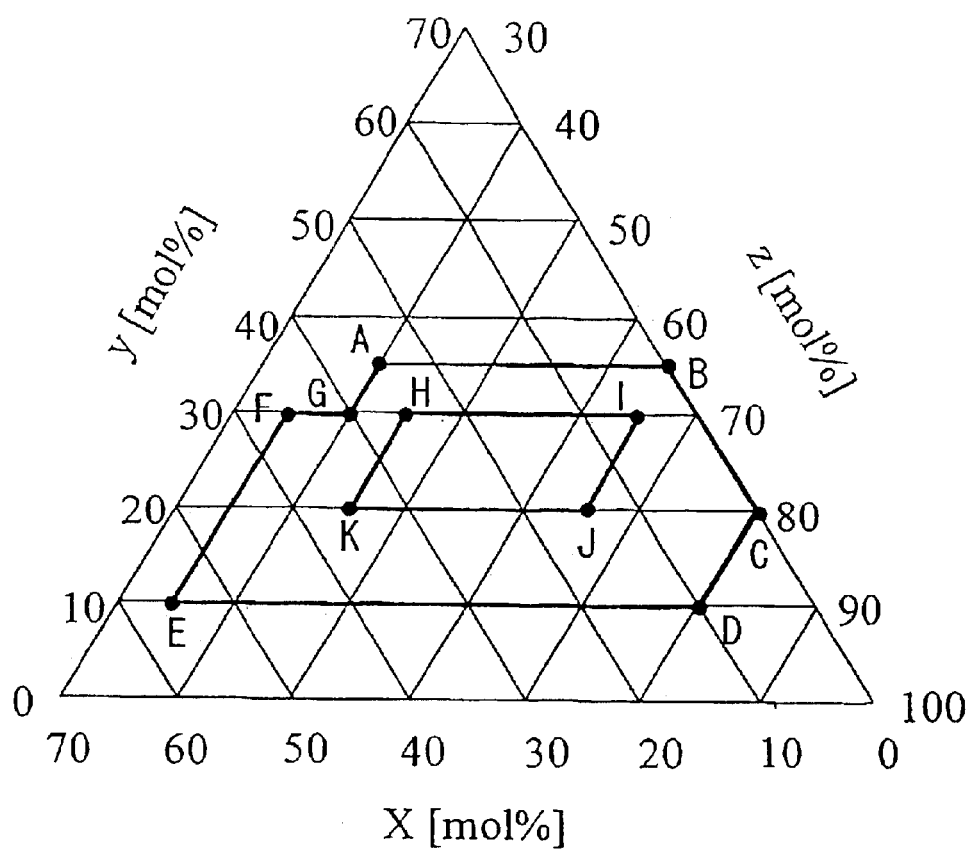
FIG. 3 is a ternary composition diagram of the $Ba\{(Sn_u Zr_{1-u})_x (Zn_t Mg_{1-t})_y Nb_z\}_v O_w$ system translucent ceramic of the present invention.

FIG. 3 is a ternary composition diagram showing the compositional range of x, y, and z in the composite perovskite crystal phase represented by Formula II: $Ba\{(Sn_uZr_{1-u})_x(Zn_tMg_{1-t})_yNb_z\}_vO_w$, wherein x+y+z=1, $0\leq t\leq 1.00$, $0\leq u\leq 1.00$, $1.00\leq v\leq 1.450$; and w is arbitrary.

The translucent ceramic having a composition within the range enclosed by the polygon ABCDEFG in FIG. 3 formed by connecting Point A (0.25, 0.35, 0.40), Point B (0, 0.35, 0.65), Point C (0, 0.20, 0.80), Point D (0.10, 0.10, 0.80), Point E (0.55, 0.10, 0.35), Point F (0.35, 0.30, 0.35), and Point G (0.30, 0.30, 0.40) including the lines connecting each point, has a high linear transmittance of equal to or more than 20% and a high refractive index of equal to or more than 2.0 and typically about 2.13.

More preferably, x, y, and z in Formula III lie within the range enclosed by Point H (x=0.250, y=0.300, z=0.450), Point I (x=0.050, y=0.300, z=0.650), Point J (x=0.150, y=0.200, z=0.650), and Point K (x=0.350, y=0.200, z=0.450).

The translucent ceramic having a composition within the range enclosed by the square HIJK formed by connecting Point H (0.250, 0.300, 0.450), Point I (0.050, 0.300, 0.650), Point J (0.150, 0.200, 0.650), and Point K (0.350, 0.200, 0.450), including the lines connecting each point, has a high linear transmittance of equal to or more than 50% and a high refractive index of about 2.13.

The translucent ceramic having the third composition according to the present invention exhibits high optical properties in linear transmittance and refractive index, is paraelectric and invites no double refraction, as described in detail below, as in the translucent ceramics having the first and second compositions according to the present invention.

The translucent ceramics having the first, second and third compositions according to the present invention preferably further comprise at least one metallic element selected from iron, cobalt, and nickel in an amount less than or equal to 1.2% by mole relative to the polycrystalline oxide. By comprising an iron group metal including iron, cobalt and nickel in an amount less than or equal to 1.2% by mole, the absorption properties (light transmission properties and light absorption properties at each wavelength) of the translucent ceramics can be controlled according to necessity.

The translucent ceramics of the present invention are preferably free of lead in their polycrystalline oxides. The lead is believed to put a heavy burden upon the environment. The translucent ceramics of the present invention are therefore advantageous in that they exhibit no double fraction and that they contain no lead as compared with PLZT system ($PbTiO_3$—$PbZrO_3$ system) translucent ceramics.

The translucent ceramics can be produced by, for example, a process in which a ceramic material powder with a binder is molded into a predetermined shape and thereby yields a ceramic green compact, the green compact is brought into contact with a ceramic powder having substantially the same composition with the ceramic material powder, and the ceramic green compact in contact with the ceramic powder is then fired. In this process, the ceramic green compact is typically preferably embedded in the ceramic powder and is then fired.

Specifically, by bringing the ceramic green compact into contact with the ceramic material powder to thereby suppress variation in composition of the ceramic green compact due to evaporation of volatile components in the ceramic green compact, the translucent ceramic having a refractive index of equal to or more than 1.9 and being paraelectric can stably be obtained.

The ceramic powder having the substantially same composition with the ceramic material powder may be a ceramic powder containing an element similar to at least one of plural elements (excluding oxygen) constituting the ceramic material powder for the formation of the translucent ceramic. The ceramic powder preferably contains all the plural elements constituting the ceramic material powder. The compositional ratios of individual elements in the ceramic powder may differ from, but are preferably similar to, those in the ceramic material powder.

Preferably, the temperature of the translucent ceramic green compact is raised in an oxidizing atmosphere to a temperature at which the binder can be removed, and the translucent ceramic green compact is then fired at an oxygen concentration higher than that in the oxidizing atmosphere. For example, when the process steps from the initiation to the removal of the binder are performed in an atmosphere of the air, the subsequent firing process of the ceramic green compact is preferably performed in an oxidizing atmosphere in an oxygen concentration of equal to or more than 90% by volume, more preferably equal to or more than 95% by volume, and typically preferably equal to or more than 98% by volume. This procedure can further stably yield a translucent ceramic having a refractive index of equal to or more than 1.9 and being paraelectric.

The optical devices of the present invention are also directed to optical devices using the translucent ceramics of the present invention as optical parts. Specifically, the translucent ceramics of the present invention are highly useful as optical parts such as lenses, prisms, and optical path control plates. Such optical devices comprising these optical parts include, for example, optical pickups, flat optical devices, optical oscillators, optical waveguides, electroluminescent elements, acoustooptic devices, and rod lenses.

These optical devices each comprise an optical part using the translucent ceramic of the present invention as a constitutional part, can therefore be miniaturized and can have satisfactory performances.

The translucent ceramics, methods of producing the same, and optical devices using the translucent ceramics will be illustrated in detail with reference to several examples below.

EXAMPLE 1

High-purity $BaCO_3$, $SnO_2$, $ZrO_2$, $MgCO_3$ and $Ta_2O_5$ as material powders were weighed and were wet-mixed together in a ball mill for 16 hours and thereby yielded a mixture having compositional ratios: $Ba\{(Sn_uZr_{1-u})_x Mg_yTa_z\}_vO_w$ wherein u=0.67, x=0.16, y=0.29, z=0.55, and v=1.02. The ratio w after firing was about 3. The ratios x, y, and z satisfy the following condition: x+y+z=1.00

The mixture was dried, was then calcined at 1300° C. for 3 hours and thereby yielded a calcined compact. The calcined compact was wet-milled in a ball mill with water and an organic binder for 16 hours. Organic binders for use herein may be organic binders that react with oxygen in the air to thereby disappear from the green compact as gases such as carbon dioxide gas or water vapor during sintering in the air at a temperature below the sintering temperature, for example, about 500° C. Such organic binders include ethyl cellulose, for example.

The milled compact was dried, was filtrated through a 50-mesh sieve, was granulated and thereby yielded a ceramic material powder. The ceramic material powder was then molded at a pressure of 2000 kg/cm$^2$ and thereby yielded a disc-shaped ceramic green compact 30 mm in diameter and 1.8 mm in thickness.

The ceramic green compact was embedded in a ceramic powder having the same composition with the ceramic material powder. The ceramic powder having the same composition with the ceramic material powder had been obtained by preparing a mixture having the same composition with the ceramic green compact, firing the mixture, and pulverizing the resulting fired ceramic. The ceramic powder may not necessarily exhibit translucency. The ceramic powder has only to contain the same constitutional elements with those of the ceramic green compact, which compositional ratios may differ from each other.

Next, the ceramic green compact embedded in the ceramic powder was heated in a firing furnace in an atmosphere of the air to temperatures at which the organic binder disappear from the ceramic green compact. After removing the binder, the ceramic green compact was raised in temperature while the firing atmosphere in the firing furnace was controlled by supplying oxygen to the air atmosphere to an oxygen concentration higher than that in the air. The oxygen concentration in the firing furnace may be controlled at, for example, 90% by volume. While maintaining the controlled firing atmosphere, the inside temperature of the firing furnace was raised to a firing temperature of, for example, 1600° C., and the ceramic green compact was fired for 20 hours while maintaining these firing temperature and firing atmosphere and thereby yielded a sintered compact. Thus, a translucent ceramic containing a composite perovskite crystal structure as a principle crystal phase was prepared.

The sintered compact was found to have a $Ba(Mg,Ta)O_3$ system crystal structure as a result of X-ray diffraction (XRD) analysis. Due to their ion radii, Ba was contained in the A-site, and Mg and Ta were contained in the B-site in the composite perovskite crystal structure.

The firing temperature and time can be set depending on the material composition used. When the material has the aforementioned composition, the ceramic green compact may be fired at temperatures ranging from 1550° C. to 1650° C. for equal to or more than 10 hours. By firing under this condition, the sintered compact becomes a translucent ceramic having satisfactory optical properties.

The above-prepared sintered compact was subjected to mirror finishing to a thickness of 0.4 mm using an abrasive as physical polishing.

The linear transmittance and refractive index of the above-prepared Ba(Sn,Zr,Mg,Ta)O$_3$ system translucent ceramic were determined. The linear transmittance was determined at measuring wavelengths λ of from 180 nm to 900 nm using a spectrophotometer (UV-200S) available from Shimadzu Corporation. The refractive index was determined at a measuring wavelength λ of 633 nm using a prism coupler (available from Metricon; MODEL 2010).

In addition, the thickness of the prepared translucent ceramic was changed to 0.2 mm, 0.4 mm and 1.0 mm to verify the relationship between the linear transmittance and the thickness. As a comparative sample, a commercially available optical polycrystalline YAG (yttrium-aluminium-garnet, Y$_3$Al$_5$O$_{12}$) was treated in the same manner as above, and the linear transmittance and refractive index of the resulting article were determined.

Figure 4:
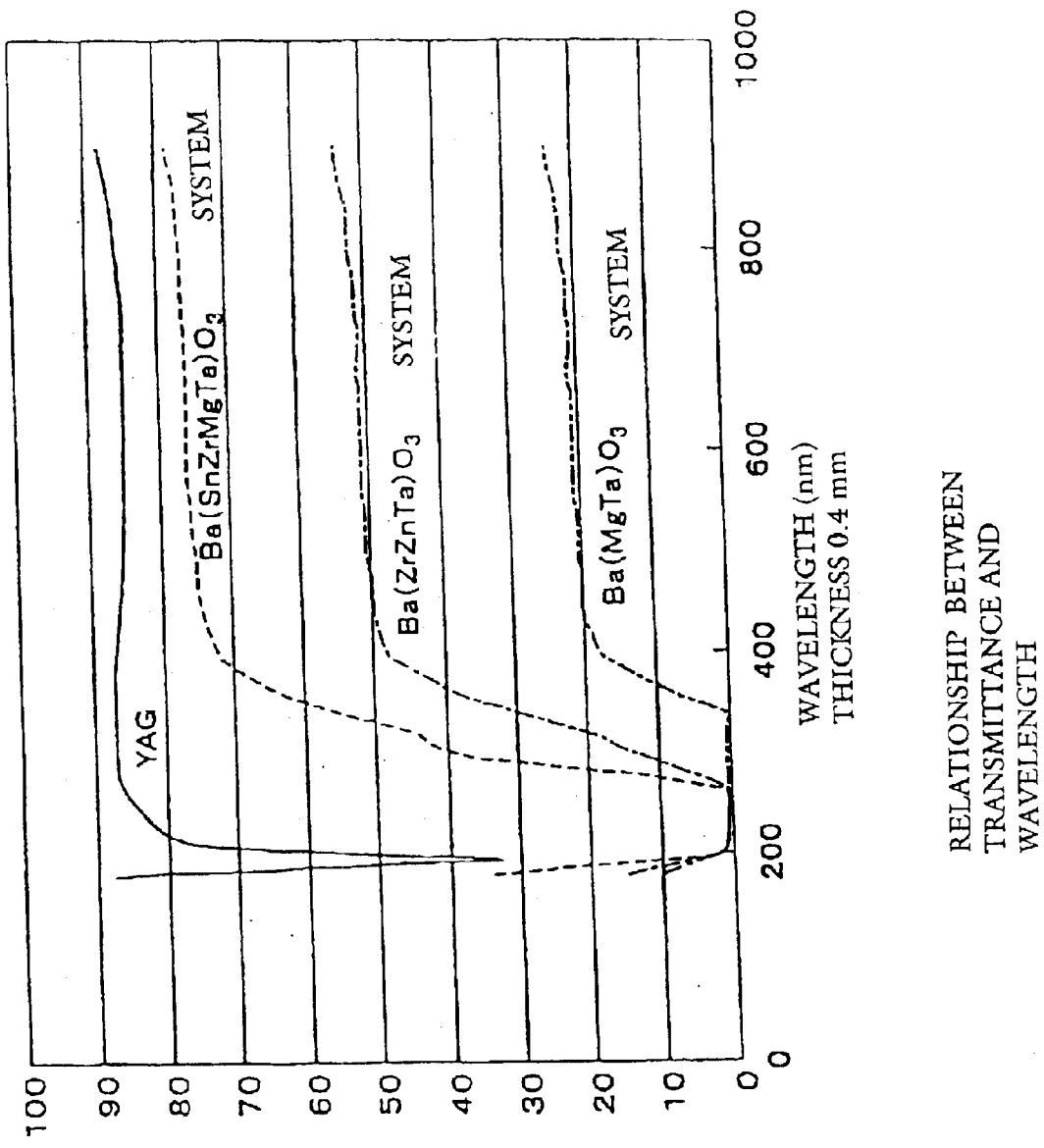
FIG. 4 is a graph showing the relationship between the wavelength and the transmittance of the $Ba(Sn,Zr,Mg,Ta)O_3$ system translucent ceramic and other ceramics.
Figure 5:
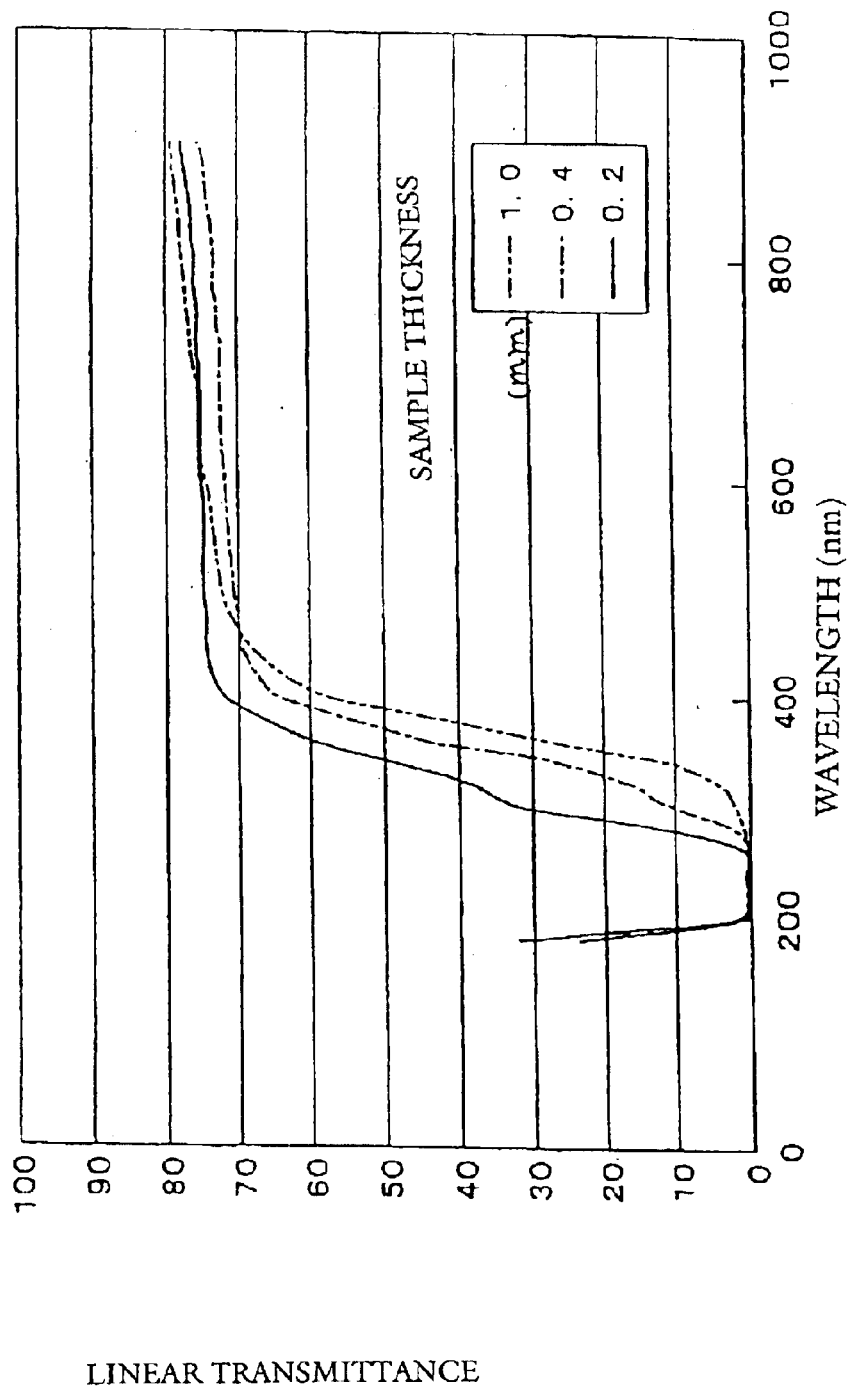
FIG. 5 is a graph showing the relationship between the thickness and the transmittance of the $Ba(Sn,Zr,Mg,Ta)O_3$ system translucent ceramic and other ceramics.

FIGS. 4 and 5 show the measurements of the linear transmittance and the measurements of the relationship between the linear transmittance and the thickness, respectively, on the above samples and comparative sample. Table 1 shows the measurements of the refractive index, and the characteristics of the other translucent materials.

TABLE 1

| Type | Material | Linear transmittance λ = 630 nm | Refractive index λ = 633 nm | Double refraction |
|---|---|---|---|---|
| Single crystal | LiNbO$_3$ | 80 | 2.3 | Yes |
| | LiTaO$_3$ | 80 | 2.14 | Yes |
| Poly-crystal | Alumina | ≦70 | 1.76 | No |
| | YAG | 83 | 1.82 | No |
| | PLZT | ≦70 | 2.5 | Yes |
| | Ba (Sn, Zr, Mg, Ta) O$_3$ system | 75 | 2.1 | No |
| Optical glass | — | 90 | 1.5–1.8 | No |
| Plastics | Poly(methyl methacrylate) | 92 | 1.49 | Yes |
| | Polycarbonate | 90 | 1.58 | Yes |

* YAG: Y$_3$Al$_5$O$_{12}$,
PLZT: (Pb, La) (Zr, Ti)O$_3$

The refractive index (n) of the Ba(Sn,Zr,Mg,Ta)O$_3$ system translucent ceramic is 2.1.

Upon determination of the linear transmittance, light enters the sample vertically from the air. When the refractive index (n) is 2.1, the total of reflectance on the surface and back of the sample amounts to 23%. Accordingly, the theoretical value (theoretical maximum) of the linear transmittance of the sample is 77%.

The Ba(Sn,Zr,Mg,Ta)O$_3$ system translucent ceramic shows a linear transmittance of about 75%, equivalent to the theoretical value, regardless of its thickness. This indicates that the sample is almost free of defects in its crystal and that the sample can be used as an optical part.

By applying an AR coating (anti-reflection coating) to the surface of this sample, the resulting sample can yield a linear transmittance of about 100%. The polycrystalline YAG as the comparative sample has a linear transmittance near to the theoretical value but has a refractive index as low as 1.8.

Figure 6:
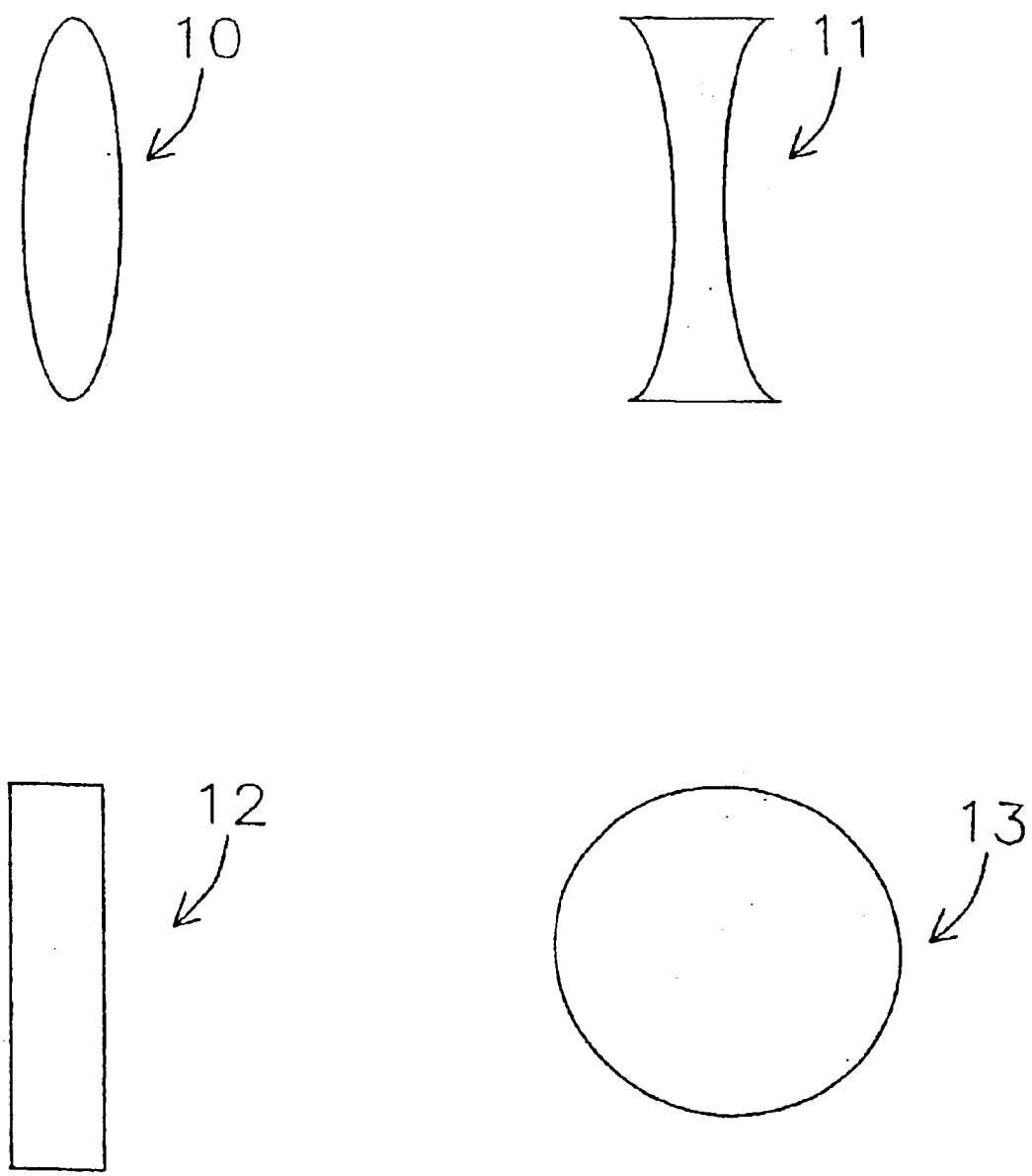
FIG. 6 is a schematic diagram showing an optical part using the translucent ceramic as an embodiment of the present invention.

As thus described, the Ba(Sn,Zr,Mg,Ta)O$_3$ system translucent ceramic has a refractive index higher than the YAG system translucent ceramic and has a high linear transmittance. In addition, the Ba(Sn,Zr,Mg,Ta)O$_3$ system translucent ceramic is a polycrystalline paraelectric and therefore exhibits no double refraction. Such a material satisfying all the properties as above has not been found in conventional optical materials such as the materials shown in Table 1. The inventive material is therefore a hopeful candidate as a material for optical devices and optical parts such as a biconvex lens 10, a biconcave lens 11, an optical path control plate 12, and a spherical lens 13 in FIG. 6.

Next, the influence of the oxygen concentration in the firing atmosphere to the linear transmittance was determined.

Figure 7:
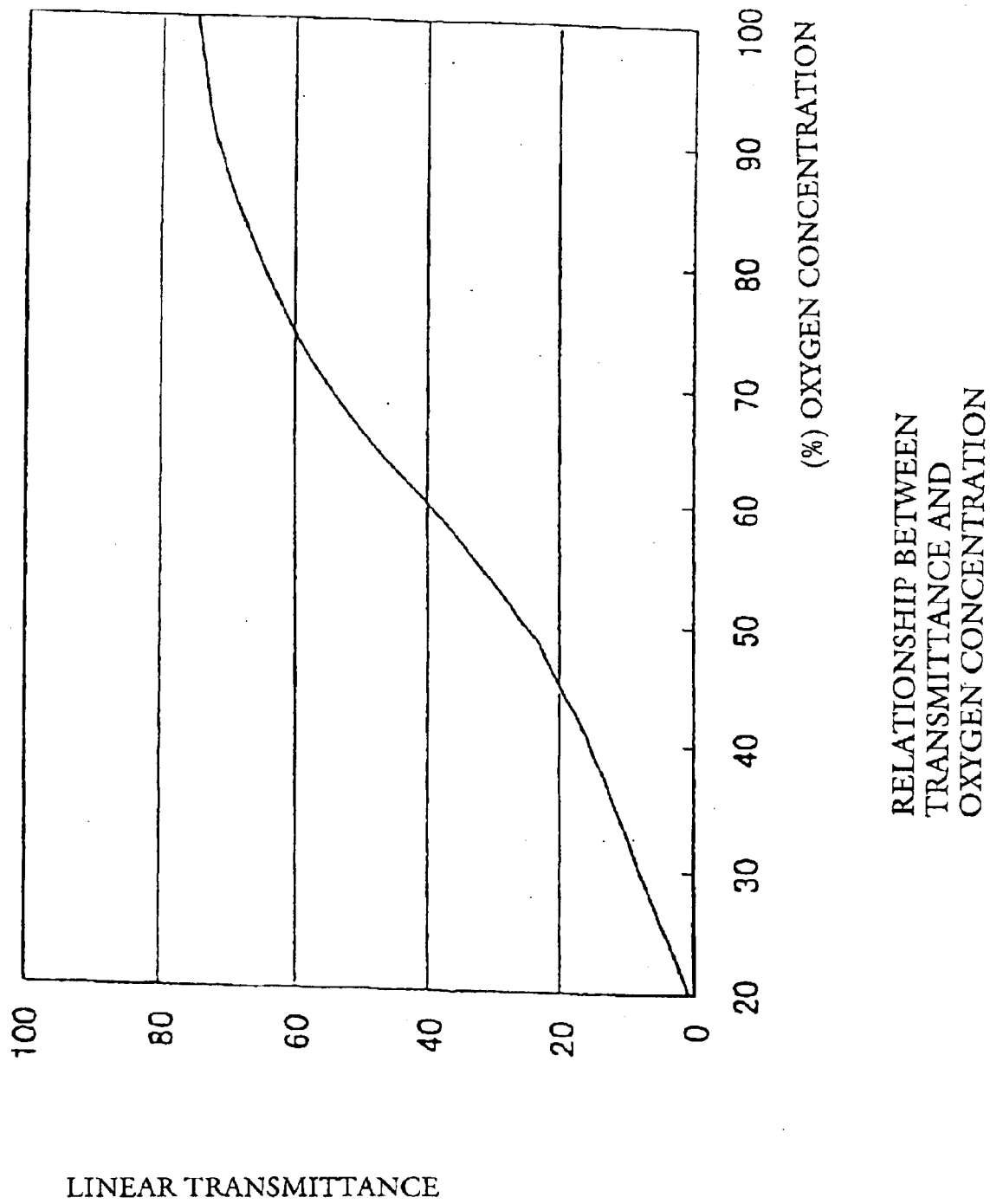
FIG. 7 is a graph showing the relationship between the oxygen concentration of a firing atmosphere and the transmittance of the present invention.

Initially, a series of Ba(Sn,Zr,Mg,Ta)O$_3$ system translucent ceramics 0.4 mm thick was prepared at different oxygen concentrations of the firing atmosphere. The linear transmittance of the obtained samples were determined, and the measurement results are shown in FIG. 7. The results show that the oxygen concentration of the firing atmosphere is preferably equal to or more than 45% (a range in which a linear transmittance of equal to or more than 20% is obtained), more preferably equal to or more than 65% (a range in which a linear transmittance of equal to or more than 50% is obtained), and further preferably equal to or more than 90%.

In the Ba(Sn,Zr,Mg,Ta)O$_3$ system translucent ceramic, part of the A-site elements of the perovskite crystal phase may be replaced with alkaline earth metals such as Sr or Ca, and part of Ta of the B-site may be replaced with, for example, Sb, Nb or W.

EXAMPLE 2

High-purity BaCO$_3$, ZrO$_2$, ZnO and Ta$_2$O$_5$ as material powders were weighed, were wet-mixed together in a ball mill for 16 hours and thereby yielded a mixture having a compositional formula: Ba(Zr$_x$Zn$_y$Ta$_z$)$_a$O$_w$, wherein x=0.03, y=0.32, z=0.65, and a=1.02. The ratio w after firing was about 3.

The mixture was dried, was then calcined at 1200° C. for 3 hours and thereby yielded a calcined compact. The calcined compact was wet-milled in a ball mill with water and an organic binder for 16 hours. The milled compact was dried, was filtrated through a 50-mesh sieve, was granulated and thereby yielded a ceramic material powder. The ceramic material powder was then molded at a pressure of 2000 kg/cm$^2$ and thereby yielded a disc-shaped ceramic green compact 30 mm in diameter and 1.8 mm in thickness.

The ceramic green compact was then embedded in a ceramic powder having the same composition as the ceramic material powder in the same manner as in Example 1. The ceramic powder having the same composition with the ceramic material powder had been obtained by preparing a mixture having exactly the same composition with the ceramic green compact, firing the mixture, and pulverizing the resulting fired ceramic. The ceramic powder may not necessarily exhibit translucency. The ceramic powder has only to contain the same constitutional elements with those of the ceramic green compact, which compositional ratios may differ from each other.

Next, the ceramic green compact embedded in the ceramic powder was heated in a firing furnace in an atmosphere of the air to temperatures at which the organic binder disappear from the ceramic green compact. After removing the binder, the ceramic green compact was raised in temperature to a firing temperature of 1500° C. while maintaining the firing atmosphere, and the ceramic green compact was fired for 10 hours while maintaining the firing atmosphere and temperature and thereby yielded a sintered compact. The ceramic green compact having this composition is preferably sintered at sintering temperatures ranging from 1500° C. to 1600° C. for equal to or more than 5 hours.

The prepared sintered compact was subjected to mirror finishing to a thickness of 0.4 mm using an abrasive and thereby yielded a translucent ceramic containing a Ba(Zn,Ta)$O_3$ system composite perovskite crystal structure as a principle crystal phase.

The linear transmittance and refractive index of the Ba(Zn,Ta)$O_3$ system translucent ceramic were determined in the same manner as in Example 1 and were found to be 50% and 2.1, respectively.

The resulting translucent ceramic has a high linear transmittance and a high refractive index even in a composition containing a composite perovskite crystal phase as a principle crystal phase different from the composition of Example 1.

In the present example, part of the A-site elements of the perovskite crystal phase may be replaced with alkaline earth metals such as Sr or Ca, and part of Ta of the B-site may be replaced with, for example, Sb, Nb or W.

EXAMPLE 3

High-purity $BaCO_3$, $SnO_2$, $ZrO_2$, $MgCO_3$, NiO and $Ta_2O_5$ as material powders were prepared. The material powders other than NiO were weighed, were wet-mixed together in a ball mill for 16 hours and thereby yielded a mixture having a compositional formula: $Ba[(Sn_uZr_{1-u})_xMg_yTa_z]_vO_w$ wherein u=1, x=0.15, y=0.29, z=0.56, and v=1.02. The ratio w after firing was about 3.

The mixture was dried, was then calcined at 1300° C. for 3 hours and thereby yielded a calcined compact. To the calcined compact was added NiO in an amount of 1.0% by mole in terms of Ni. The resulting calcined compact mixture was wet-milled in a ball mill with water and an organic binder for 16 hours. The milled compact was dried, was filtrated through a 50-mesh sieve, was granulated and thereby yielded a ceramic material powder. The ceramic material powder was then molded at a pressure of 2000 kg/$cm^2$ and thereby yielded a disc-shaped ceramic green compact 30 mm in diameter and 1.8 mm in thickness.

The ceramic green compact was then fired under the same condition as in Example 1. The prepared sintered compact was subjected to mirror finish to a thickness of 0.4 mm using an abrasive and thereby yielded a Ni-containing Ba(Mg,Ta)$O_3$ system translucent ceramic.

As a comparative sample, a sample was prepared in the same manner as above, except that NiO was added in an amount of 1.5% by mole.

Figure 8:
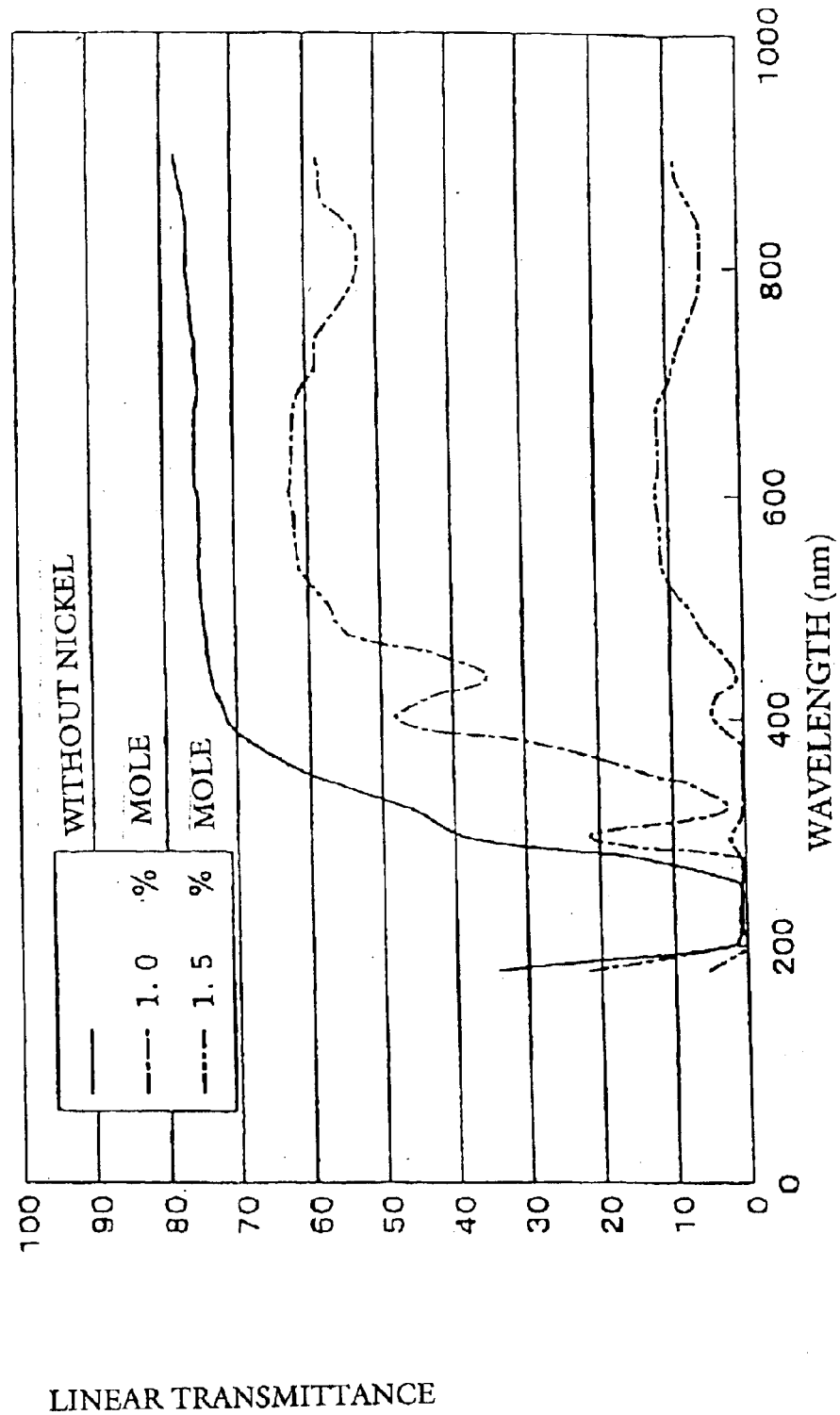
FIG. 8 is a graph showing the relationship between the wavelength and the linear transmittance of a Ni-containing $Ba(Mg,Ta)O_3$ system translucent ceramic of the present invention.

The linear transmittance and the refractive index of these samples were determined in the same manner as in Example 1. Each of these samples was found to have a refractive index of 2.1. The relationship between their linear transmittance and the wavelength is shown in FIG. 8. FIG. 8 indicates that the Ba(Mg,Ta)$O_3$ system translucent ceramic containing 1.0% by mole of Ni shows sharp transmittance peaks at wavelength λ of 400 nm and 300 nm. This waveband coincides with that of blue-violet laser useful as short-wavelength laser, and the sample is very useful as a laser band-pass filter.

In contrast, the Ba(Mg,Ta)$O_3$ system translucent ceramic containing 1.5% by mole of Ni tends to have a decreased linear transmittance.

EXAMPLE 4

High-purity $BaCO_3$, $MgCO_3$, and $Ta_2O_5$ as material powders were weighed and thereby yielded a material powder having a compositional formula: Ba(Mg$_y$Ta$_z$)$_v$$O_3$ wherein y=0.33, z=0.67, and v=1.03. Using the material powder, a Ba(Mg,Ta)$O_3$ system translucent ceramic was prepared in the same manner as in Example 1.

The linear transmittance of the Ba(Mg,Ta)$O_3$ system translucent ceramic was determined, and the result is also shown in FIG. 4. The Ba(Mg,Ta)$O_3$ system translucent ceramic has a linear transmittance of about 20% which is somewhat lower than that of the Ba(Sn,Zr,Mg,Ta)$O_3$ system translucent ceramic. By forming an anti-reflection coating thereon, this translucent ceramic can be used as a material for optical parts.

In the above examples, the ceramic green compacts were molded by pressing, but such ceramic green compacts may be prepared by wet molding such as casting using a slurry containing the ceramic material powder.

To bring a ceramic green compact into contact with a ceramic powder having the same composition with the ceramic green compact, the ceramic green compact in the above examples was embedded in the ceramic powder having the same composition with the ceramic green compact. It is also acceptable that the ceramic green compact is placed on or in a substance having the same composition with the ceramic green compact, such as a sintered plate or sheath, and is then fired. Specifically, when the sintered plate is used, the ceramic green compact may be placed on the sintered plate. Likewise, when the sheath is used, the green compact may be placed in the sheath.

EXAMPLE 5

The translucent ceramic having the first composition represented by Formula I: $Ba\{(Sn_uZr_{1-u})_xMg_yTa_z\}_vO_w$, where w is an arbitrary number will be illustrated in further detail in the present example.

Initially, high-purity $BaCO_3$, $SnO_2$, $ZrO_2$, $MgCO_3$ and $Ta_2O_5$ as material powders were weighed, were wet-mixed together in a ball mill for 16 hours and thereby yielded mixtures having compositions represented by Formula I: $Ba\{(Sn_uZr_{1-u})_xMg_yTa_z\}_vO_w$, where w is an arbitrary number as shown in Table I-1. Each of the mixtures was dried, was then calcined at 1300° C. for 3 hours and thereby yielded a calcined compact.

The calcined compact was wet-milled in a ball mill with water and an organic binder for 16 hours. As the organic binder, ethyl cellulose can be used, for example. In addition to ethyl cellulose, organic binders for use herein include organic binders that react with oxygen in the air to thereby disappear from the green compact as gases such as carbon dioxide gas or water vapor during sintering in the air at a temperature below the sintering temperature, for example, about 500° C.

The milled compact was dried, was filtrated through a 50-mesh sieve, was granulated and thereby yielded a ceramic material powder. The ceramic material powder was then compressed at a pressure of 2000 kg/$cm^2$ and thereby yielded a disc-shaped ceramic green compact 30 mm in diameter and 2 mm in thickness.

The ceramic green compact was embedded in a powder having the same composition with the ceramic material powder. The powder having the same composition with the ceramic material powder had been obtained by preparing a material powder having the same composition with the ceramic green compact, firing the mixture, and pulverizing the resulting fired ceramic. The powder can suppress evaporation of volatile components in the ceramic green compact during firing.

Next, the ceramic green compact embedded in the powder was heated in a firing furnace in an atmosphere of the air to thereby remove the binder. After removing the binder, the ceramic green compact was further raised in temperature to a maximum temperature of 1600° C. while the oxygen concentration in the firing furnace was controlled to about 98% by supplying oxygen to the atmosphere. The ceramic green compact was fired for 20 hours while maintaining these firing temperature and oxygen concentration and thereby yielded a sintered compact, i.e., a translucent ceramic.

The types of the material powders are not limited to oxides and carbonates, as long as devices having desired properties can be obtained as sintered final products. In the above procedure, the firing atmosphere was an oxidizing atmosphere. The oxygen concentration in this procedure is preferably equal to or more than 90% by volume and more preferably equal to or more than 98% by volume. The remained several percents of the atmosphere may be, for example, components of the air and inert gases. The firing process is performed without pressurization, in contrast to hot isostatic pressing (HIP), and the total pressure is less than or equal to 1 atmospheric pressure. It is not necessary to perform the firing process in a pressurized atmosphere (under a load).

The above-prepared sintered compacts were subjected to mirror finishing and thereby yielded disc-shaped translucent ceramic samples 0.4 mm thick.

The linear transmittance in a waveband from the ultraviolet region to the infrared region ($\lambda$ of 200 to 10000 nm) and refractive index of each of the above-prepared samples were determined. In this procedure, the linear transmittance in a waveband from the ultraviolet region to the visible light region and that in the infrared region were determined using a spectrophotometer available from Shimadzu Corporation (UV-200S) and a spectrophotometer available from Nicolet Instrument Technologies, Inc. (FT-IR Magna 750), respectively. The refractive index and double refraction were determined using a prism coupler available from Metricon (MODEL 2010).

The measured results of the linear transmittance and refractive index are shown in Table I-1.

TABLE I-1 (A)

| Sample No. | u | x | y | z | v | Firing at 1600° C. Linear transmittance (%) 633 (nm) | Firing at 1600° C. Refractive index 633 (nm) | Firing at 1650° C. Linear transmittance (%) 633 (nm) | Firing at 1650° C. Refractive index 633 (nm) |
|---|---|---|---|---|---|---|---|---|---|
| 1 | 1.000 | 0.200 | 0.150 | 0.650 | 1.033 | unsintered | — | unsintered | — |
| 2 | 0.000 | 0.100 | 0.350 | 0.550 | 1.033 | 0.0 | — | 0.0 | — |
| 3 | 1.000 | 0.200 | 0.350 | 0.450 | 1.033 | unsintered | — | unsintered | — |
| 4 | 0.500 | 0.400 | 0.150 | 0.450 | 1.033 | 20.5 | 2.081 | 20.5 | 2.081 |
| 5 | 0.667 | 0.300 | 0.150 | 0.550 | 1.033 | 20.5 | 2.082 | 20.5 | 2.082 |
| 6 | 0.333 | 0.300 | 0.248 | 0.452 | 1.033 | 63.5 | 2.081 | 65.0 | 2.081 |
| 7 | 0.320 | 0.312 | 0.248 | 0.440 | 1.033 | 50.0 | 2.082 | 55.0 | 2.082 |
| 8 | 0.222 | 0.450 | 0.250 | 0.300 | 1.033 | unsintered | — | unsintered | — |
| 9 | 0.364 | 0.275 | 0.248 | 0.477 | 1.033 | 64.2 | 2.080 | 73.8 | 2.080 |
| 10 | 0.333 | 0.225 | 0.273 | 0.502 | 1.033 | 60.2 | 2.079 | 62.1 | 2.079 |
| 11 | 0.340 | 0.050 | 0.300 | 0.650 | 1.010 | 20.5 | 2.074 | 20.5 | 2.074 |
| 12 | 0.338 | 0.075 | 0.275 | 0.650 | 1.010 | 20.5 | 2.074 | 20.5 | 2.074 |
| 13 | 0.336 | 0.125 | 0.225 | 0.650 | 1.005 | 20.5 | 2.075 | 20.5 | 2.075 |
| 14 | 0.449 | 0.075 | 0.325 | 0.600 | 1.035 | 23.5 | 2.075 | 40.0 | 2.075 |
| 15 | 0.462 | 0.100 | 0.325 | 0.575 | 1.035 | 34.1 | 2.077 | 41.1 | 2.076 |
| 16 | 0.436 | 0.125 | 0.300 | 0.575 | 1.030 | 51.5 | 2.077 | 68.2 | 2.077 |
| 17 | 0.447 | 0.150 | 0.300 | 0.550 | 1.035 | 50.0 | 2.077 | 60.6 | 2.077 |
| 18 | 0.430 | 0.175 | 0.275 | 0.550 | 1.020 | 67.1 | 2.078 | 72.5 | 2.078 |
| 19 | 0.446 | 0.187 | 0.288 | 0.525 | 1.035 | 69.5 | 2.078 | 70.7 | 2.077 |
| 20 | 0.439 | 0.200 | 0.275 | 0.525 | 1.030 | 67.1 | 2.078 | 68.5 | 2.078 |
| 21 | 0.427 | 0.225 | 0.250 | 0.525 | 1.015 | 55.5 | 2.078 | 65.8 | 2.079 |
| 22 | 0.418 | 0.250 | 0.225 | 0.525 | 1.000 | 35.5 | 2.079 | 45.8 | 2.079 |
| 23 | 0.418 | 0.250 | 0.225 | 0.525 | 1.005 | 21.2 | 2.080 | 27.1 | 2.080 |
| 24 | 0.440 | 0.237 | 0.263 | 0.500 | 1.035 | 73.9 | 2.078 | 73.1 | 2.078 |
| 25 | 0.425 | 0.275 | 0.225 | 0.500 | 1.010 | 50.0 | 2.081 | 53.2 | 2.079 |
| 26 | 0.443 | 0.250 | 0.263 | 0.487 | 1.030 | 52.5 | 2.078 | 67.1 | 2.078 |
| 27 | 0.432 | 0.300 | 0.225 | 0.475 | 1.015 | 74.2 | 2.079 | 68.2 | 2.079 |
| 28 | 0.448 | 0.275 | 0.263 | 0.462 | 1.040 | 52.8 | 2.078 | 53.9 | 2.079 |
| 29 | 0.448 | 0.275 | 0.263 | 0.462 | 1.050 | 34.8 | 2.079 | 38.8 | 2.079 |
| 30 | 0.448 | 0.275 | 0.263 | 0.462 | 1.060 | 0.0 | — | 0.0 | — |
| 31 | 0.448 | 0.275 | 0.263 | 0.462 | 0.980 | unsintered | — | unsintered | — |
| 32 | 0.448 | 0.100 | 0.200 | 0.700 | 1.030 | 0.0 | — | 0.0 | — |
| 33 | 0.437 | 0.325 | 0.225 | 0.450 | 1.020 | 71.8 | 2.080 | 70.5 | 2.079 |

* The symbols in the parenthesis after the sample numbers correspond to the individual points in FIG. 1.

TABLE I-1 (B)

|  |  |  |  |  |  | Firing at 1600° C. | | Firing at 1650° C. | |
| --- | --- | --- | --- | --- | --- | --- | --- | --- | --- |
| Sample No. | u | x | y | z | v | Linear transmittance (%) 633 (nm) | Refractive index 633 (nm) | Linear transmittance (%) 633 (nm) | Refractive index 663 3(nm) |
| 35 | 0.673 | 0.162 | 0.284 | 0.554 | 1.025 | 75.8 | 2.074 | 74.0 | 2.074 |
| 36 | 1.000 | 0.148 | 0.292 | 0.560 | 1.028 | 75.0 | 2.071 | 73.5 | 2.071 |
| 37 | 0.000 | 0.000 | 0.348 | 0.652 | 1.033 | 22.0 | 2.074 | 22.0 | 2.074 |
| 38 (A) | 0.333 | 0.400 | 0.230 | 0.370 | 1.033 | 0.0 | — | 0.0 | — |
| 39 (B) | 0.333 | 0.000 | 0.390 | 0.610 | 1.033 | 0.0 | — | 0.0 | — |
| 40 (C) | 0.333 | 0.000 | 0.270 | 0.730 | 1.033 | 20.0 | 2.071 | 20.0 | 2.071 |
| 41 (D) | 0.333 | 0.400 | 0.110 | 0.490 | 1.033 | 20.5 | 2.081 | 20.5 | 2.081 |
| 42 (E) | 0.333 | 0.400 | 0.210 | 0.390 | 1.033 | 50.5 | 2.079 | 50.8 | 2.079 |
| 43 (F) | 0.333 | 0.125 | 0.325 | 0.550 | 1.033 | 50.2 | 2.077 | 65.5 | 2.077 |
| 44 (G) | 0.333 | 0.125 | 0.290 | 0.585 | 1.033 | 51.5 | 2.077 | 68.5 | 2.077 |
| 45 (H) | 0.333 | 0.400 | 0.170 | 0.430 | 1.033 | 50.8 | 2.079 | 51.5 | 2.079 |
| 46 | 0.333 | 0.200 | 0.300 | 0.500 | 1.033 | 45.0 | 2.078 | 45.0 | 2.078 |

\* The symbols in the parenthesis after the sample numbers correspond to the individual points in FIG. 1.

Figure 9A:
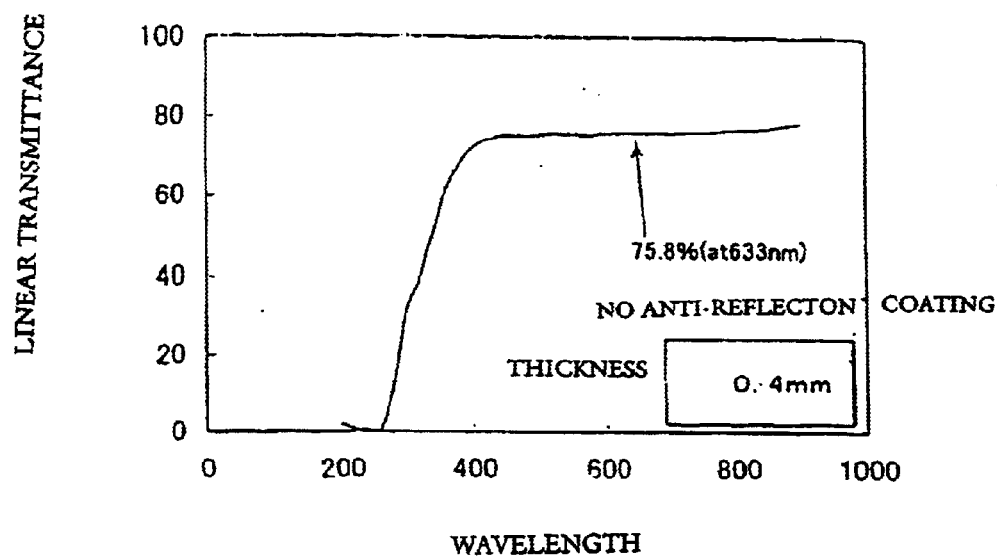
FIGS. 9A and 9B are graphs showing the relationship between the wavelengths ranging from 200 to 800 nm and ranging from 200 to 10000 nm, respectively, and the linear transmittance of a translucent ceramic with a first composition according to the present invention (Sample No. 35).
Figure 9B:
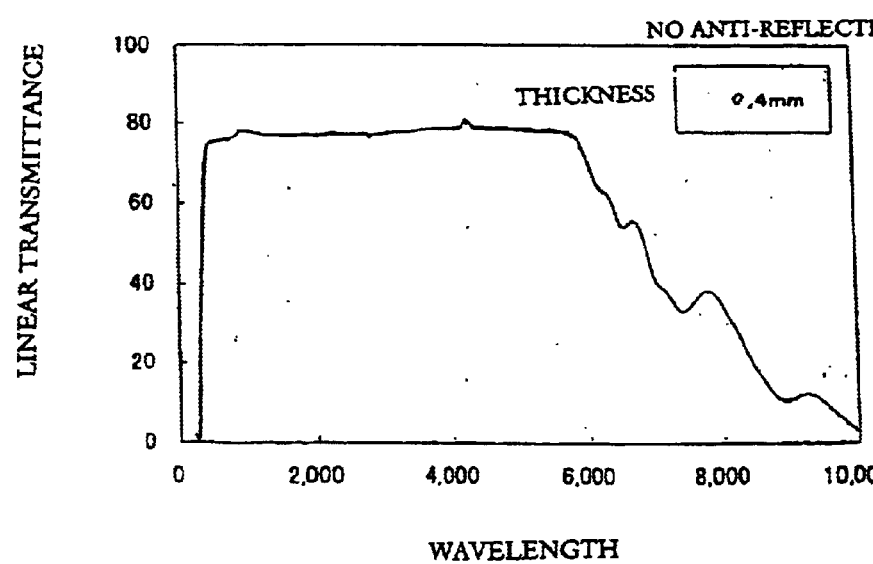
Figure 10:
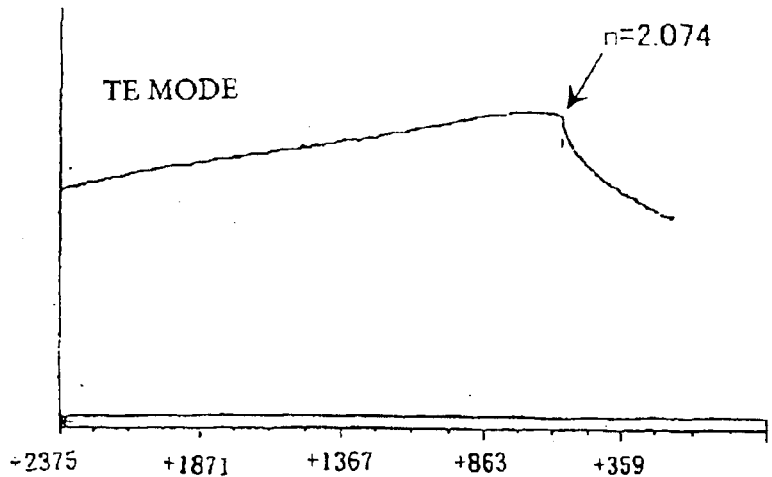
FIG. 10 is a graph showing an example of measured refractive indexes in transverse electric mode (TE mode) of the translucent ceramic having the first composition according to the present invention (Sample No. 35).

Of the samples shown in Table I-1, the translucent ceramic Sample No. 35 having a specifically high linear transmittance was subjected to determination of the relationship between the linear transmittance and the wavelength. The measured data are shown in FIGS. 9A and 9B. The refractive index in transverse electric mode of the translucent ceramic with Sample No. 35 was measured, and the result is shown in FIG. 10. In addition, the refractive indexes of Sample No. 35 in transverse electric mode (TE mode) and transverse magnetic mode (TM mode) at wavelengths λ of 633 nm, 1300 nm and 1550 nm were determined, and the results are shown in Table I-2 below.

Table I-2 shows that the translucent ceramic in question has the same refractive index both in TE mode and TM mode, indicating that the sample invites no double refraction.

The translucent ceramic Sample No. 35 has a linear transmittance of about 75.8%, and a relative transmittance to the theoretical value is 98.5%. This means that the sintered sample is almost free of transmission loss inside thereof. By forming an anti-reflection coating (AR coating) on the surface of the translucent ceramic Sample No. 35, the resulting article can have a linear transmittance substantially identical to the theoretical value. The translucent ceramics according to the present example have satisfactory optical properties and can therefore be used as optical devices.

Among the samples shown in Table I-1, the translucent ceramic Sample No. 34 has a high linear transmittance. A material powder having the same composition with the translucent ceramic Sample No. 34 was molded by casting into a 2-inch square green compact, and the resulting green compact was fired at 1600° C. and thereby yielded a translucent ceramic.

TABLE I-2

| Sample No. | u | x | y | z | v | Refractive index | | Wavelength (nm) |
| --- | --- | --- | --- | --- | --- | --- | --- | --- |
| | | | | | | TE mode | TM mode | |
| 35 | 0.673 | 0.162 | 0.284 | 0.554 | 1.025 | 2.074 | 2.074 | 633 |
| | | | | | | 2.040 | 2.040 | 1300 |
| | | | | | | 2.035 | 2.035 | 1550 |

The translucent ceramic Sample No. 35 has a linear transmittance of 75.8% and a refractive index of 2.074. In general, upon determination of the linear transmittance, light enters the sample vertically from the air. When the refractive index (n) is 2.074, the total of reflectance on the surface and back of the sample amounts to 23.1% according to the Fresnel's law. Accordingly, the theoretical value (theoretical maximum) of the linear transmittance of the sample having a refractive index of 2.074 is 76.9%.

Table I-3 below shows the comparison in linear transmittance and refractive index between the translucent ceramic prepared by pressing and the translucent ceramic prepared by casting, both having the composition of Sample No. 34. Table I-3 indicates that the two translucent ceramics have equivalent linear transmittance and refractive index. As thus described, the translucent ceramics according to the present example have a high linear transmittance and a satisfactory refractive index regardless of molding processes.

TABLE I-3

| Sample No. | u | x | y | Z | v | Pressing Linear transmittance (%) 633 (nm) | Pressing Refractive index 633 (nm) | Casting Linear transmittance (%) 633 (nm) | Casting Refractive index 633 (nm) |
|---|---|---|---|---|---|---|---|---|---|
| 34 | 0.441 | 0.350 | 0.225 | 0.425 | 1.030 | 75.8 | 2.079 | 76.0 | 2.079 |

Table I-1 shows the measurement results of the linear transmittance and the refractive index on samples fired at different temperatures. These samples were prepared in the following manner. The same material powders as in the above example were subjected to calcining, milling, drying, and granulating the same under the same condition as above, the resulting ceramic material powders were molded into discs, the resulting ceramic green compacts were fired at a maximum temperature range of 1650° C. Some of the samples fired at 1650° C. show a higher linear transmittance than the samples fired at 1600° C.

As shown in FIG. 1, the translucent ceramics having the first composition within the range enclosed by the square ABCD formed by connecting Points A, B, C, and D, excluding the line AB, have a high linear transmittance of equal to or more than 20% and a high refractive index of about 2.07. In addition, the translucent ceramics having the first composition within the range enclosed by the square EFGH formed by connecting Points E, F, G, and H in FIG. 1 have a high linear transmittance of equal to or more than 50% and a high refractive index of about 2.07.

Consequently, the translucent ceramics according to the present example have high linear transmittance and refractive index, exhibit no double refraction and can thereby be applied to various optical parts.

EXAMPLE 6

Next, the translucent ceramics having the second composition represented by Formula II: $Ba(Zr_xZn_yTa_z)_vO_w$, wherein w is an arbitrary number, will be illustrated in detail below.

Initially, high-purity $BaCO_3$, $ZrO_2$, $ZnO$, and $Ta_2O_5$ as material powders were weighed, were wet-mixed together in a ball mill for 16 hours and thereby yielded samples having compositions represented by Formula II: $Ba(Zr_xZn_yTa_z)_vO_w$ as shown in Table II-1. Each of the mixtures was dried, was then calcined at 1200° C. for 3 hours and thereby yielded a calcined compact.

The calcined compact was wet-milled in a ball mill with water and an organic binder for 16 hours. The milled compact was dried, was filtrated through a 50-mesh sieve, was granulated and thereby yielded a ceramic material powder. The ceramic material powder was then molded at a pressure of 2000 kg/cm² and thereby yielded a disc-shaped ceramic green compact 30 mm in diameter and 2 mm in thickness.

The ceramic green compact was embedded in a powder having the same composition with the ceramic material powder. The ceramic green compact embedded in the powder was placed in a sheath, was fired at 1550° C. in an atmosphere of oxygen gas (about 98% oxygen concentration) for 10 hours and thereby yielded a sintered compact, i.e., a translucent ceramic. The both edges of the ceramic compact were subjected to mirror finishing to a thickness of 0.4 mm and thereby yielded a test sample.

The types of the material powders are not limited to oxides and carbonates, as long as devices having desired properties can be obtained as sintered final products. In the above procedure, the firing atmosphere was an oxidizing atmosphere. The oxygen concentration in this procedure is preferably equal to or more than 90% by volume and more preferably equal to or more than 98% by volume. The remained several percents of the atmosphere may be, for example, components of the air and inert gases. The firing process is performed without pressurization, in contrast to HIP, and the total pressure is less than or equal to 1 atmospheric pressure. It is not necessary to perform the firing procedure in a pressurized atmosphere (under a load).

The linear transmittance in a waveband from the ultraviolet region to visible light region (λ of 200 to 900 nm) and refractive index of each of the above-prepared samples were determined. Of the translucent ceramic Sample No. 13-2 having a high linear transmittance, the relationship between the refractive index and the wavelength at wavelengths λ of from 300 to 850 nm was determined, and the refractive index at λ of 633 nm in TE mode and TM mode was determined to verify the presence or absence of double refraction.

In this procedure, the linear transmittance was determined using a spectrophotometer available from Shimadzu Corporation (UV-200S). The refractive index and double refraction were determined using a prism coupler available from Metricon (MODEL 2010), and the relationship between the refractive index and the wavelength was determined using an ellipsometer available from SENTECH (SE 800).

Figure 11:
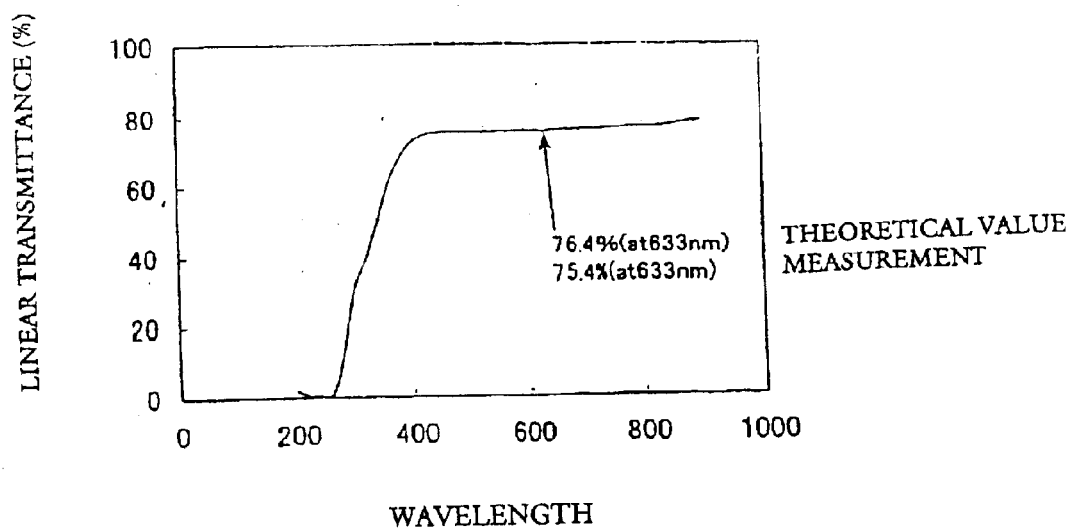
FIG. 11 is a graph showing the relationship between the wavelength and the liner transmittance of a translucent ceramic with a second composition according to the present invention (Sample No. 13-2).
Figure 12:
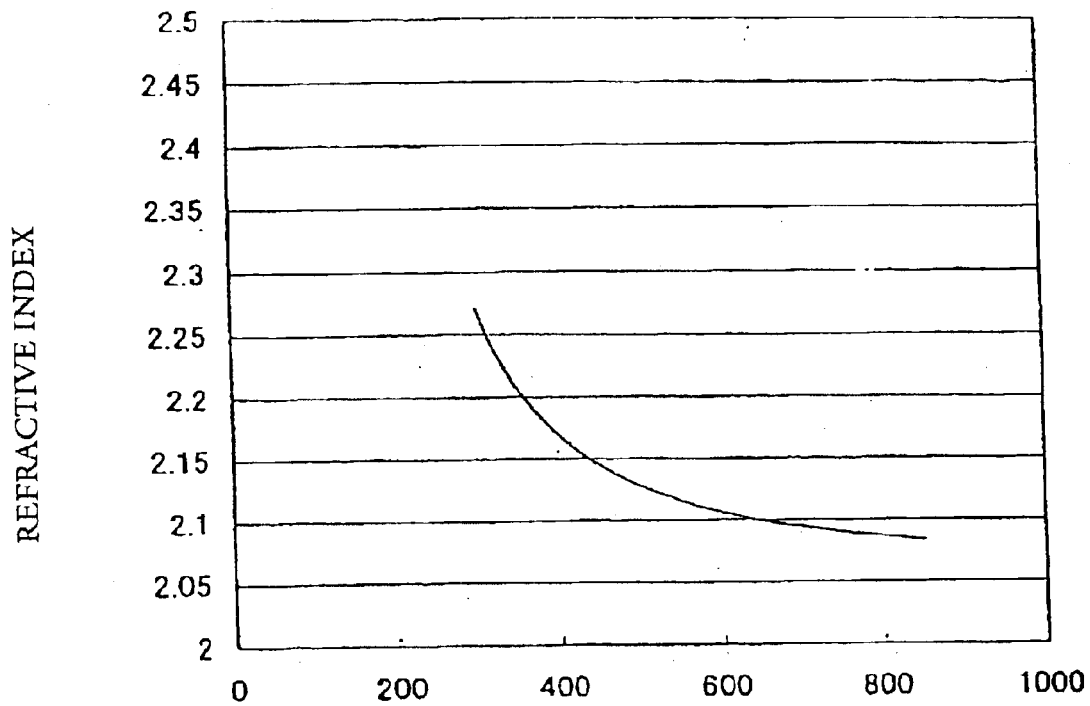
FIG. 12 is a graph showing the relationship between the wavelength and the refractive index of the translucent ceramic of the second composition according to the present invention (Sample No. 13-2).

The measured results are shown in Table II-1 below. FIGS. 11 and 12 show the relationship between the linear transmittance and the wavelength, and the relationship between the refractive index and the wavelength, respectively, of the translucent ceramic Sample No. 13-2.

TABLE II-1

| | | | | | Firing at 1550° C. | |
|---|---|---|---|---|---|---|
| Sample No. | x | y | z | v | Linear transmittance (%) 633 (nm) | Refractive index 633 (nm) |
| 1 | 0.025 | 0.425 | 0.550 | 1.005 | Unsintered | |
| 2 | 0.080 | 0.400 | 0.520 | 1.005 | 8.5 | — |
| 4 | 0.025 | 0.375 | 0.600 | 1.005 | 0 | — |
| 3 | 0.000 | 0.400 | 0.600 | 1.005 | 13.5 | — |
| 5 | 0.100 | 0.350 | 0.550 | 1.005 | Unsintered | |
| 6 (C) | 0.060 | 0.360 | 0.580 | 1.005 | 20.5 | 2.098 |
| 7 (D) | 0.010 | 0.360 | 0.630 | 1.005 | 22.5 | 2.100 |
| 8 (G) | 0.050 | 0.350 | 0.600 | 1.005 | 52.5 | 2.099 |
| 9 | 0.020 | 0.350 | 0.630 | 1.005 | 50.0 | 2.100 |
| 10 | 0.030 | 0.340 | 0.630 | 1.005 | 64.5 | 2.100 |
| 11 | 0.010 | 0.340 | 0.650 | 1.005 | 20.5 | 2.100 |
| 12 | 0.080 | 0.310 | 0.610 | 1.005 | 15.5 | — |
| 13-1 | 0.030 | 0.320 | 0.650 | 1.000 | 15.0 | — |

TABLE II-1-continued

| | | | | | Firing at 1550° C. | |
|---|---|---|---|---|---|---|
| Sample No. | x | y | z | v | Linear transmittance (%) 633 (nm) | Refractive index 633 (nm) |
| 13-2 | 0.030 | 0.320 | 0.650 | 1.005 | 75.4 | 2.101 |
| 13-3 | 0.030 | 0.320 | 0.650 | 1.030 | 75.2 | 2.101 |
| 13-4 | 0.030 | 0.320 | 0.650 | 1.050 | 75.0 | 2.101 |
| 13-5 | 0.030 | 0.320 | 0.650 | 1.055 | 10.5 | — |
| 14 | 0.000 | 0.320 | 0.680 | 1.005 | 1.0 | — |
| 15 (F) | 0.050 | 0.300 | 0.650 | 1.005 | 50.0 | 2.102 |
| 16 (E) | 0.020 | 0.300 | 0.680 | 1.005 | 50.0 | 2.104 |
| 17 (B) | 0.060 | 0.290 | 0.650 | 1.005 | 25.5 | 2.102 |
| 18 (A) | 0.010 | 0.290 | 0.700 | 1.005 | 22.5 | 2.105 |
| 19 | 0.080 | 0.250 | 0.670 | 1.005 | 1.0 | — |
| 20 | 0.030 | 0.250 | 0.720 | 1.005 | 1.0 | — |
| 21 | 0.000 | 0.250 | 0.750 | 1.005 | 1.0 | — |
| 22 | 0.005 | 0.230 | 0.720 | 1.005 | Unsintered | |

* The symbols in the parenthesis after the sample numbers correspond to the individual points in FIG. 2.

Next, to compare molding processes, a 2-inch square ceramic green compact having the same composition with the translucent ceramic Sample No. 13-2 was prepared, was fired and mirror-finished under the same conditions as above, and the linear transmittance and the refractive index of the resulting article were determined. The results are shown in Table II-2 below. Table II-2 shows that the translucent ceramics according to the present example have a high refractive index and a satisfactory linear transmittance regardless of the molding processes.

TABLE II-2

| | | | | | Pressing | | Casting | |
|---|---|---|---|---|---|---|---|---|
| Sample No. | x | y | z | v | Linear transmittance (%) 633 (nm) | Refractive index 633 (nm) | Linear transmittance (%) 633 (nm) | Refractive index 633 (nm) |
| 13-2 | 0.030 | 0.320 | 0.650 | 1.005 | 75.4 | 2.101 | 75.8 | 2.101 |

Table II-3 below shows the measured results of the refractive index in TE and TM modes of the translucent ceramic Sample No. 13-2 and indicates that the refractive indexes in the both modes are the same, verifying that the sample exhibits no double refraction.

TABLE II-3

| | | | | | Refractive index | |
|---|---|---|---|---|---|---|
| Sample No. | x | y | z | v | TE mode | TM mode |
| 13-2 | 0.030 | 0.320 | 0.650 | 1.005 | 2.101 | 2.101 |

By taking the translucent ceramic Sample No. 13-2 as an example, the measurement in the linear transmittance will be described in detail.

The translucent ceramic has a linear transmittance of 75.4% and a refractive index of 2.101 as mentioned above. Upon determination of the linear transmittance, light enters the sample vertically from the air. When the refractive index (n) is 2.101, the total of reflectance on the surface and back of the sample amounts to 23.6% according to the Fresnel's law. Accordingly, the theoretical value (theoretical maximum) of the linear transmittance of the sample having a refractive index of 2.101 is 76.4%. The translucent ceramic in question has a linear transmittance of 75.4%, and a relative transmittance to the theoretical value is 98.7%. This means that loss in the sintered sample is trivial. By forming an anti-reflection coating (AR coating) on the surface of the translucent ceramic, the resulting article can have a linear transmittance substantially identical to the theoretical value.

As shown in FIG. 2, the translucent ceramics having the first composition within the range enclosed by the square ABCD formed by connecting Points A, B, C, and D, excluding the line AB, have a high linear transmittance of equal to or more than 20% and a high refractive index of about 2.10. In addition, the translucent ceramics having the first composition within the range enclosed by the square EFGH formed by connecting Points E, F, G, and H in FIG. 2 have a high linear transmittance of equal to or more than 50% and a high refractive index of about 2.10.

Consequently, the translucent ceramics according to the present example have high linear transmittance and refractive index, exhibit no double refraction and can thereby be applied to various optical parts.

EXAMPLE 7

Next, the translucent ceramics having the second composition represented by Formula III: $Ba\{(Sn_uZr_{1-u})_x(Zn_tMg_{1-t})_yNb_z\}_vO_w$, wherein w is an arbitrary number, will be illustrated in detail below.

Initially, high-purity $BaCO_3$, $ZnO_2$, $ZrO_2$, ZnO, $MgCO_3$, and $Ta_2O_5$ as material powders were weighed, were wet-mixed together in a ball mill for 16 hours and thereby yielded samples having compositions represented by Formula III: $Ba\{(Sn_uZr_{1-u})_x(Zn_tMg_{1-t})_yNb_z\}_vO_w$, wherein w is an arbitrary number, as shown in Table III-1 below. Each of the mixtures was dried, was then calcined at 1200° C. for 3 hours and thereby yielded a calcined compact.

The calcined compact was wet-milled in a ball mill with water and an organic binder for 16 hours. The milled compact was dried, was filtrated through a 50-mesh sieve, was granulated and thereby yielded a ceramic material powder. The ceramic material powder was then molded at a pressure of 2000 kg/cm² and thereby yielded a disc-shaped ceramic green compact 30 mm in diameter and 2 mm in thickness.

The ceramic green compact was embedded in a powder having the same composition with the ceramic material powder. The ceramic green compact embedded in the powder was placed in a sheath, was fired at 1400° C. or 1450°

C. in an atmosphere of oxygen gas (about 98% oxygen concentration) for 20 hours, respectively, and thereby yielded a sintered compact, i.e., a translucent ceramic. The both edges of the ceramic compact were subjected to mirror finishing to a thickness of 0.4 mm and thereby yielded a test sample.

The types of the material powders are not limited to oxides and carbonates, as long as devices having desired properties can be obtained as sintered final products. In the above procedure, the firing atmosphere was an oxidizing atmosphere. The oxygen concentration in this procedure is preferably equal to or more than 90% by volume and more preferably equal to or more than 98% by volume. The remained several percents of the atmosphere may be, for example, components of the air and inert gases. The firing process is performed without pressurization, in contrast to HIP, and the total pressure is less than or equal to 1 atmospheric pressure. It is not necessary to perform the firing procedure in a pressurized atmosphere (under a load).

The linear transmittance in a waveband from the ultraviolet region to visible light region ($\lambda$ of 200 to 900 nm) and refractive index of each of the above-prepared samples were determined. On the translucent ceramic Sample No. 12-5 having a high linear transmittance, the refractive index at $\lambda$ of 633 nm and that in TE mode and TM mode was determined to verify the presence or absence of double refraction.

In this procedure, the linear transmittance was determined using a spectrophotometer available from Shimadzu Corporation (UV-200S). The refractive index and double refraction were determined using a prism coupler available from Metricon (MODEL 2010).

Figure 13:
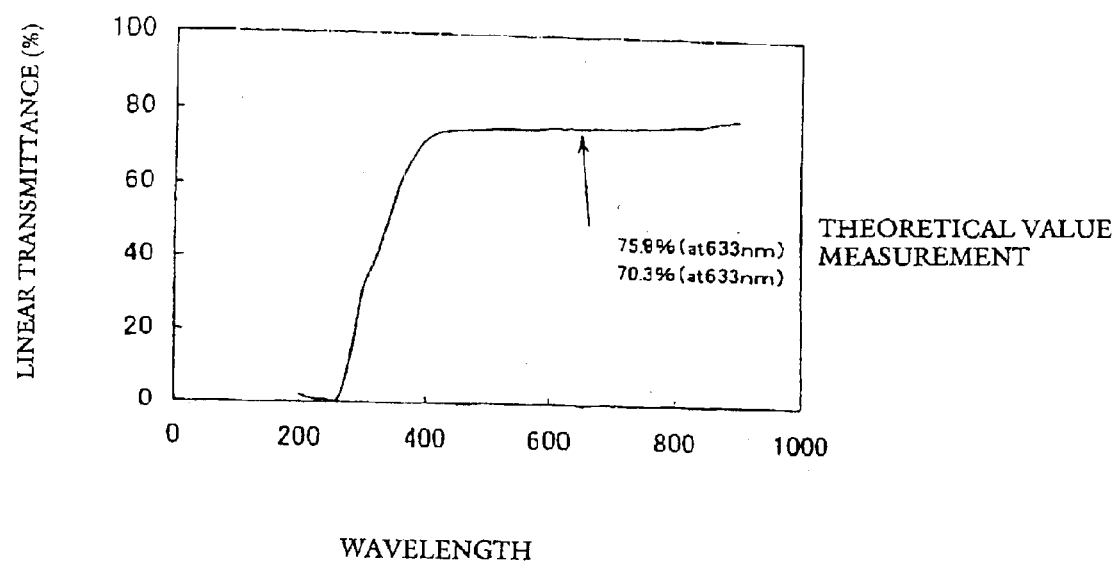
FIG. 13 is a graph showing the relationship between the wavelength and the liner transmittance of a translucent ceramic of the third composition (Sample No. 12-5) of the present invention.

The measurement results are shown in Table III-1 below. In addition, the relationship between the linear transmittance of the translucent ceramic Sample No. 12-5 and the wavelength was determined, and the result is shown in FIG. 13.

Next, to compare molding processes, a 2-inch square ceramic green compact having the same composition with

TABLE III-1 (A)

| | | | | | | | Firing at 1450° C. | |
|---|---|---|---|---|---|---|---|---|
| Sample No. | u | t | x | y | z | v | Linear transmittance (%) 622 (nm) | Refractive index 633 (nm) |
| 1 | 0.333 | 0.000 | 0.200 | 0.400 | 0.400 | 1.050 | unsintered | — |
| 2 | 0.333 | 0.000 | 0.100 | 0.400 | 0.500 | 1.050 | unsintered | — |
| 3 (A) | 0.667 | 0.000 | 0.250 | 0.350 | 0.400 | 1.100 | 20.0 | 2.121 |
| 4 (B) | 0.667 | 0.000 | 0.000 | 0.350 | 0.650 | 1.000 | 20.1 | 2.123 |
| 5 | 0.667 | 0.000 | 0.175 | 0.325 | 0.500 | 1.100 | 30.8 | 2.123 |
| 6 (F) | 0.667 | 0.000 | 0.350 | 0.300 | 0.350 | 1.100 | 20.0 | 2.121 |
| 7-1 (G) | 0.333 | 0.000 | 0.300 | 0.300 | 0.400 | 1.100 | 20.1 | 2.121 |
| 7-2 | 0.333 | 0.000 | 0.300 | 0.300 | 0.400 | 0.980 | unsintered | — |
| 8-1 (H) | 0.333 | 0.000 | 0.250 | 0.300 | 0.450 | 1.100 | 50.0 | 2.123 |
| 8-2 | 0.333 | 0.000 | 0.250 | 0.300 | 0.450 | 0.980 | unsintered | — |
| 9-1 | 0.333 | 0.000 | 0.100 | 0.300 | 0.600 | 1.030 | 50.0 | 2.130 |
| 9-2 | 0.667 | 0.000 | 0.100 | 0.300 | 0.600 | 1.030 | 50.7 | 2.130 |
| 9-3 | 1.000 | 0.000 | 0.100 | 0.300 | 0.600 | 1.030 | 50.0 | 2.130 |
| 9-4 | 0.333 | 0.000 | 0.100 | 0.300 | 0.600 | 1.050 | 50.1 | 2.123 |
| 10 (I) | 0.333 | 0.000 | 0.050 | 0.300 | 0.650 | 1.050 | 50.1 | 2.124 |
| 11 | 0.787 | 0.000 | 0.127 | 0.290 | 0.583 | 1.035 | 68.1 | 2.133 |
| 12-1 | 0.667 | 0.000 | 0.200 | 0.250 | 0.550 | 1.200 | 53.8 | 2.128 |
| 12-2 | 0.333 | 0.000 | 0.200 | 0.250 | 0.550 | 1.100 | 50.9 | 2.126 |
| 12-3 | 0.333 | 0.000 | 0.200 | 0.250 | 0.550 | 1.050 | 55.3 | 2.123 |
| 12-4 | 0.667 | 0.000 | 0.200 | 0.250 | 0.550 | 1.100 | 67.8 | 2.126 |
| 12-5 | 1.000 | 0.000 | 0.200 | 0.250 | 0.550 | 1.100 | 70.3 | 2.123 |

\* The symbols in the parenthesis after the sample numbers correspond to the individual points in FIG. 3.

TABLE III-1 (B)

| | | | | | | | Firing at 1450° C. | |
|---|---|---|---|---|---|---|---|---|
| Sample No. | u | t | x | y | z | v | Linear transmittance (%) 633 (nm) | Refractive index 633 (nm) |
| 12-6 | 1.000 | 0.000 | 0.200 | 0.250 | 0.550 | 1.070 | 62.5 | 2.130 |
| 12-7 | 1.000 | 0.000 | 0.200 | 0.250 | 0.550 | 1.450 | 70.2 | 2.133 |
| 12-8 | 0.667 | 0.500 | 0.200 | 0.250 | 0.550 | 1.100 | 67.6 | 2.128 |
| 12-9 | 0.667 | 1.000 | 0.200 | 0.250 | 0.550 | 1.100 | 67.8 | 2.132 |
| 12-10 | 1.000 | 0.500 | 0.200 | 0.250 | 0.550 | 1.100 | 70.2 | 2.128 |
| 12-11 | 1.000 | 1.000 | 0.200 | 0.250 | 0.550 | 1.100 | 70.3 | 2.132 |
| 13 | 0.333 | 0.000 | 0.150 | 0.250 | 0.600 | 1.050 | 62.5 | 2.122 |
| 14 | 0.333 | 0.000 | 0.500 | 0.200 | 0.300 | 1.050 | unsintered | — |
| 15 | 0.333 | 0.000 | 0.400 | 0.200 | 0.400 | 1.050 | 20.7 | 2.120 |
| 16 (K) | 0.333 | 0.000 | 0.350 | 0.200 | 0.450 | 1.050 | 55.1 | 2.120 |
| 17 | 0.333 | 0.000 | 0.300 | 0.200 | 0.500 | 1.050 | 51.4 | 2.121 |
| 18 | 0.333 | 0.000 | 0.250 | 0.200 | 0.550 | 1.100 | 50.0 | 2.130 |
| 19 (J) | 0.333 | 0.000 | 0.150 | 0.200 | 0.650 | 1.100 | 50.2 | 2.132 |
| 20 | 0.333 | 0.000 | 0.100 | 0.200 | 0.700 | 1.100 | 30.8 | 2.131 |
| 21 (C) | 0.333 | 0.000 | 0.000 | 0.200 | 0.800 | 1.100 | 20.1 | 2.131 |
| 22 | 0.333 | 0.000 | 0.300 | 0.150 | 0.550 | 1.100 | 31.7 | 2.130 |
| 23 | 0.300 | 0.000 | 0.200 | 0.150 | 0.650 | 1.100 | 40.8 | 2.129 |
| 24 | 0.667 | 0.000 | 0.000 | 0.150 | 0.850 | 1.100 | unsintered | — |
| 25 (E) | 0.667 | 0.000 | 0.550 | 0.100 | 0.350 | 1.100 | 20.2 | 2.122 |
| 26 (D) | 0.667 | 0.000 | 0.100 | 0.100 | 0.800 | 1.100 | 20.1 | 2.132 |
| 27 | 0.667 | 0.000 | 0.400 | 0.050 | 0.550 | 1.100 | unsintered | — |
| 28 | 0.667 | 0.000 | 0.150 | 0.050 | 0.800 | 1.050 | unsintered | — |
| 29 | 0.333 | 0.000 | 0.200 | 0.250 | 0.550 | 1.500 | 0.0 | — |

\* The symbols in the parenthesis after the sample numbers correspond to the individual points in FIG. 3.

the translucent ceramic Sample No. 12-5 was prepared, was fired and mirror-finished under the same conditions as above, and the linear transmittance and the refractive index of the resulting article were determined. The results are shown in Table III-2 below. Table III-2 shows that the samples according to the present example have a high refractive index and linear transmittance regardless of the molding processes.

TABLE III-2

| | | | | | | Pressing | | Casting | |
|---|---|---|---|---|---|---|---|---|---|
| Sample No. | u | t | x | y | z | v | Linear transmittance (%) 633 (nm) | Refractive index 633 (nm) | Linear transmittance (%) 633 (nm) | Refractive index 633 (nm) |
| 12-5 | 1.000 | 0.000 | 0.200 | 0.250 | 0.550 | 1.100 | 70.3 | 2.123 | 72.3 | 2.123 |

Table III-3 below shows the measurement results of the refractive index in TE and TM modes of the translucent ceramic Sample No. 12-5 and indicates that the refractive indexes in the both modes are the same, verifying that the sample exhibits no double refraction.

TABLE III-3

| | | | | | | | Refractive index | |
|---|---|---|---|---|---|---|---|---|
| No. | u | t | x | y | z | v | TE mode | TM mode |
| 12-5 | 1.000 | 0.000 | 0.200 | 0.250 | 0.550 | 1.100 | 2.123 | 2.123 |

Taking the translucent ceramic Sample No. 12-5 as an example, the measurements of the linear transmittance will be described below.

The translucent ceramic in question has a linear transmittance of 70.3% and a refractive index of 2.123 as mentioned above. Upon determination of the linear transmittance, light enters the sample vertically from the air. When the refractive index (n) is 2.123, the total of reflectance on the surface and back of the sample amounts to 24.2% according to the Fresnel's law. Accordingly, the theoretical value (theoretical maximum) of the linear transmittance of the sample is 75.8%. The translucent ceramic Sample No. 13-2 has a linear transmittance of about 70.3% and a relative transmittance to the theoretical value is about 93%. This means that the sintered sample exhibits nearly trivial transmission loss inside thereof. By forming an anti-reflection coating on a light incident and exit surface of the translucent ceramic, the resulting article can have a linear transmittance nearly identical to the theoretical value.

As shown in FIG. 3, the translucent ceramics having the third composition within the range enclosed by the polygon ABCDEFG formed by connecting Points A, B, C, D, E, F, and G have a high linear transmittance of equal to or more than 20% and a high refractive index of about 2.13. In addition, the translucent ceramics having the third composition within the range enclosed by the square HIJK formed by connecting Points H, I, J, and K in FIG. 3 have a high linear transmittance of equal to or more than 50% and a high refractive index of about 2.13.

Consequently, the translucent ceramics according to the present example have a high linear transmittance and a satisfactory refractive index, exhibit no double refraction and can thereby be applied to various optical parts.

First Application Embodiment

Figure 14:
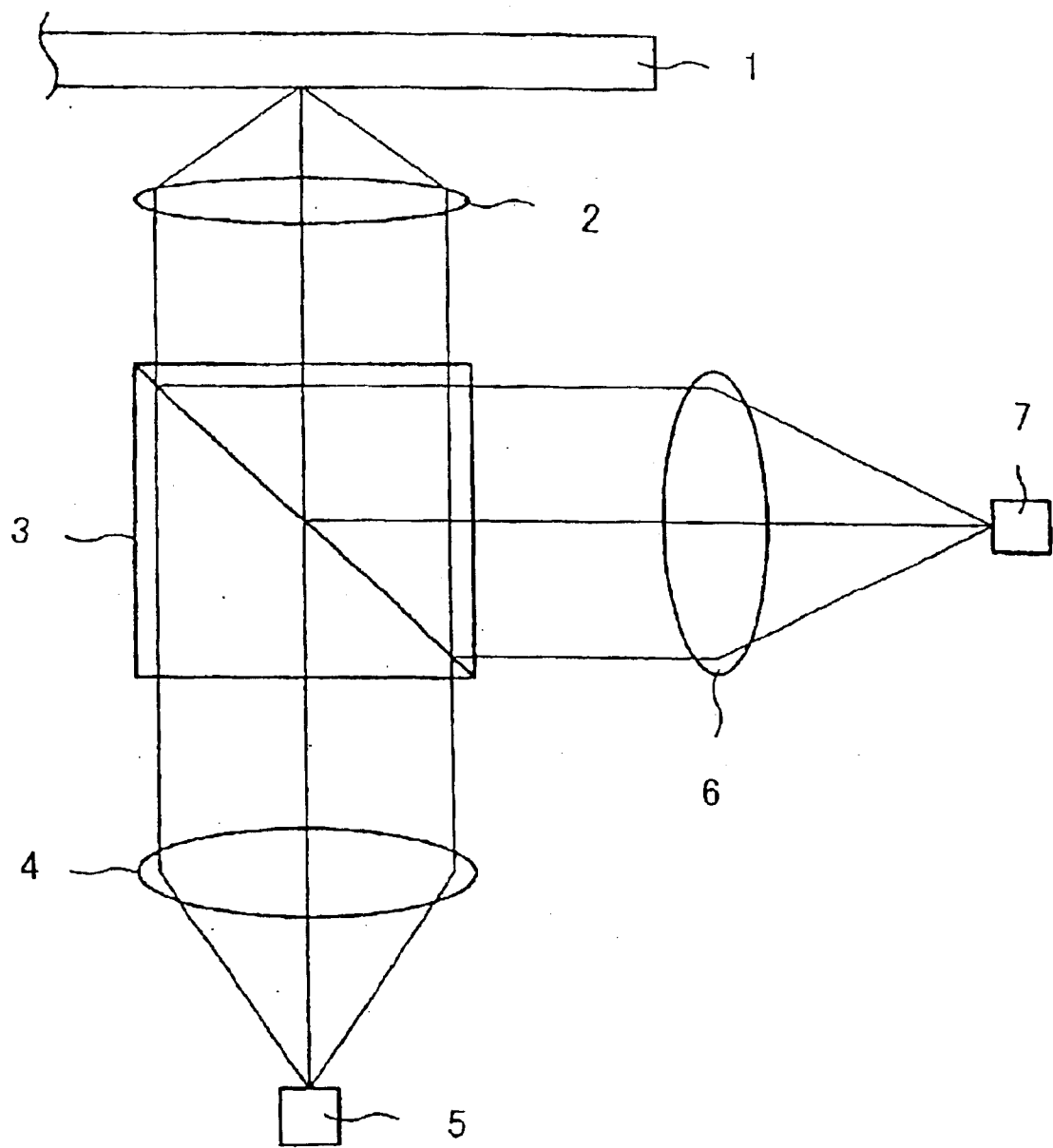
FIG. 14 is a schematic diagram of an optical pickup device according to First Application Embodiment of the present invention.

With reference to FIG. 14, an optical pickup according to the present embodiment applies laser light, a coherent light, to a recording medium 1 which moves relative to the optical pickup and reproduces information recorded on the recording medium 1 based on the reflected light from the recording medium 1. Such recording medium 1 includes, for example, Compact Discs (CDs) and MiniDiscs (MDs).

The optical pickup includes a light source such as a semiconductor laser device 5, a collimator lens 4, and a half mirror 3. The collimator lens 4 converts laser light from the semiconductor laser device 5 into a collimated light. The half mirror 3 is arranged on the optical path of the collimated light, allows incident light emitted from the semiconductor laser device 5 to travel in a straight line, but refracts the reflected light from the recording medium 1, for example, 90 degrees. An objective lens 2 is arranged between the half mirror 3 and the recording medium 1. The objective lens 2 condenses the incident light from the half mirror 3 to a recording surface of the recording medium 1 and efficiently emits the reflected light from the recording medium 1 to the half mirror 3. When the reflected light enters the half mirror 3, its phase is changed as a result of reflection, and the reflected light travels not in the direction of the incident light but in a direction toward a condenser lens 6. The reflected light is lead via the condenser lens 6 for condensing the reflected light to a photoreceptor device 7. The photoreceptor device 7 is arranged at the position where the reflected light is condensed, and is a photodetector for converting the information from the reflected light into electric signals.

In the optical pickup, the translucent ceramic can be used as a material for the objective lens 2.

Owing to a high refractive index of the translucent ceramic, the optical pickup can be miniaturized or slimmed and can have a large numerical aperture (NA) as compared with conventional optical pickups. The translucent ceramic can also be used in the other components such as the collimator lens 4, the condenser lens 6 and the half mirror 3, in addition to the objective lens 2.

Second Application Embodiment

Figure 15A:
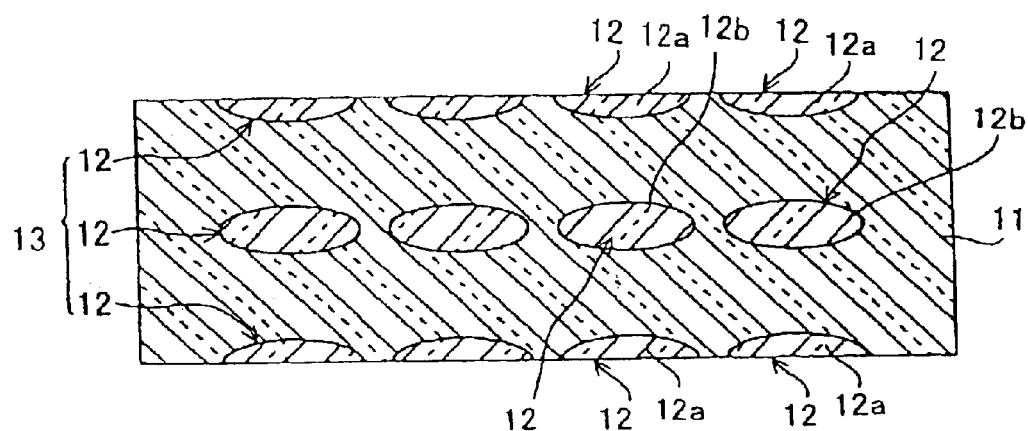
FIGS. 15A and 15B are each a schematic sectional view and a schematic diagram of its lens unit, respectively, of a flat optical device according to Second Application Embodiment of the present invention.

With reference to FIG. 15A, a flat optical device according to the present embodiment includes a substrate 11 and plural lens units (optical function units) 12 such as plano-convex lenses and biconvex lenses. The plural lens units 12 are arranged as an array with respect to the substrate 11 in such a manner that the optical axis of each of the lens units 12 is along a thickness direction of the substrate 11.

Figure 15B:
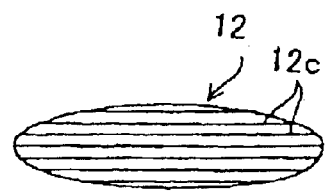

With reference to FIG. 15B, each lens unit 12 is formed by inserting a dopant 12c such as Ti into the substrate 11 in the thickness direction and firing the resulting article to thereby allow the dopant 12c to diffuse in the form of a lens into the substrate 11. Specifically, the lens units 12 have a refractive index different from that of the substrate 11. The flat optical device has such optical functions as to condense or diffuse light entered nearly along a rotation axis of the lens units 12 due to difference in refractive index between the substrate 11 and the lens units 12.

As translucent ceramics for constituting thee substrate 11 and/or the lens units 12, the ceramics of the present invention can be used.

The individual lens units 12 arranged in the thickness direction of the substrate 11 are arrayed so as to have optical axes nearly coincident with one another and to face one another. The individual lens units 2 arranged in a plane direction of the substrate are arrayed at equal intervals.

In the flat optical device having this configuration, optical systems 13 comprising the individual lens units 12 arranged in the thickness direction of the substrate 11 each have an optical axis in common with the constitutional lens units 12 and arranged in the plane direction of the substrate 11 as an array.

The flat optical device therefore enables the optical properties of the individual optical systems 13 to coincide with one another and is thereby useful as an optical function device that can bring the light rays, for example, to a focus of each CCD (charge coupled device) in a CCD array.

In addition, the flat optical device can further comprise a planoconvex lens 12a formed on a surface of the substrate 11 and a biconvex lens 12b formed inside the substrate 11, respectively, according to necessity. By forming the biconvex lens 12b, the resulting flat optical device can have an optical function unit with a high magnification and a large numerical aperture.

The flat optical device can be produced, for example, according to the following procedure.

Figure 16:
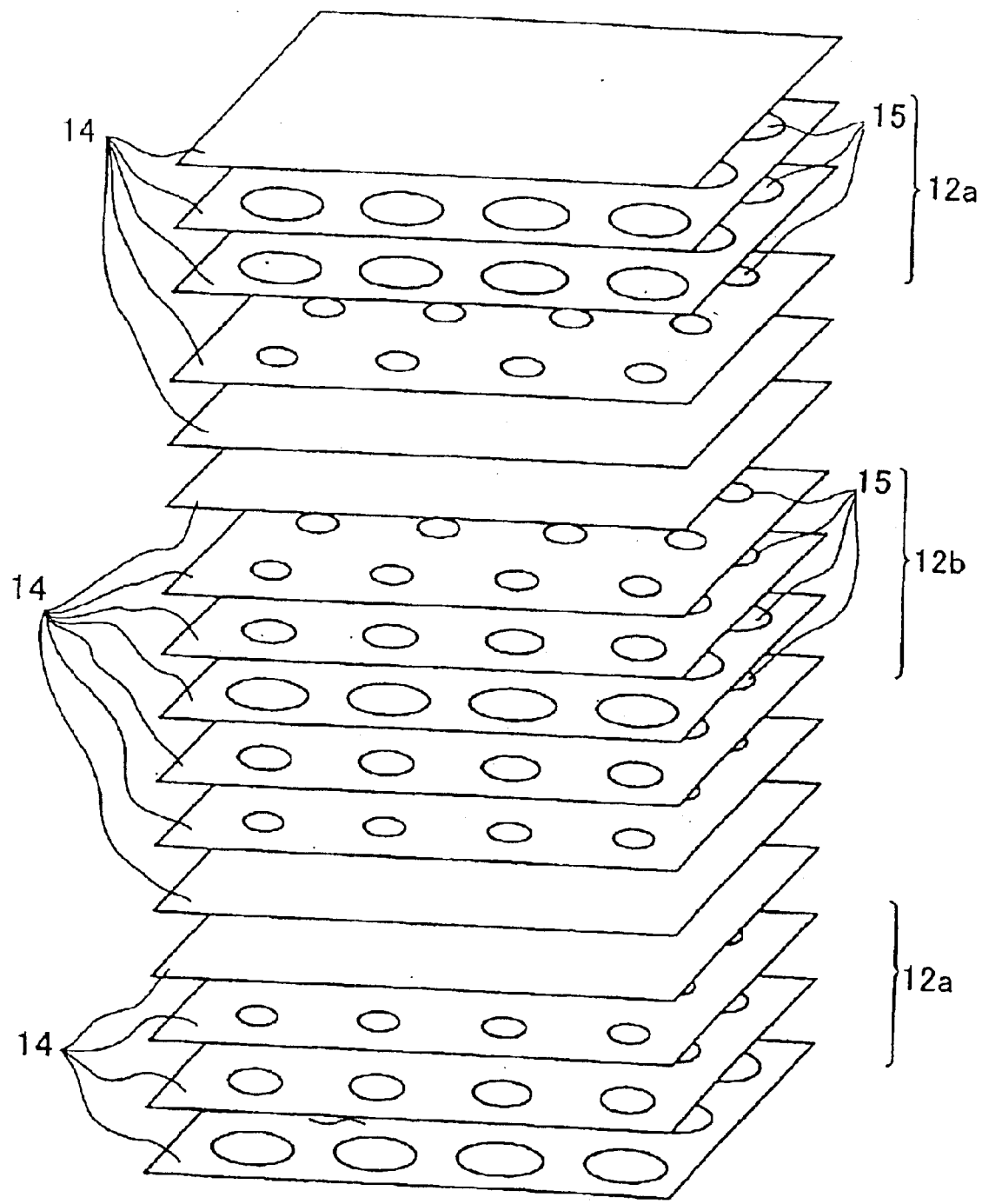
FIG. 16 is a schematic perspective view showing a process step for the production of the flat optical device according to Second Application Embodiment of the present invention.

Initially, the aforementioned ceramic material powder is prepared, is wet-milled in a ball mill with an organic binder for, for example, 16 hours and thereby yields a slurry. The slurry is molded into a sheet by a process such as doctor blade process and thereby yields a green sheet having a thickness of from about 10 $\mu$m to about 30 $\mu$m. The green sheet is then cut to rectangles 30 mm wide and 40 mm length, for example. With reference to FIG. 16, paste areas (dopant areas) 15 containing a dopant are formed on the surfaces of the green sheets 14 by printing or coating to a substantially round shape having such a pattern that the lens units 12 can be formed as microlenses.

FIG. 16 shows examples of the pattern. Specifically, as a pattern for the formation of the planoconvex lenses 12a, nearly round paste areas 15 are arranged coaxially on each of adjacent green sheets 14 so that the paste areas 15 each have a diameter sequentially decreasing from the surface of the ultimately obtained substrate 11. As a pattern for the formation of the biconvex lenses 12b, nearly round paste areas 15 are arranged coaxially on each of adjacent green sheets 14 so that the paste areas 15 each have a diameter sequentially increasing and then sequentially decreasing in the thickness direction of the substrate 11.

These paste areas 15 are formed by screen printing each of the paste areas 15 to a thickness less than that of the green sheet 14 (preferably, one fifth or less the thickness of the green sheet 14), for example, to a thickness of several micrometers and drying the printed paste areas 15.

Figure 17:
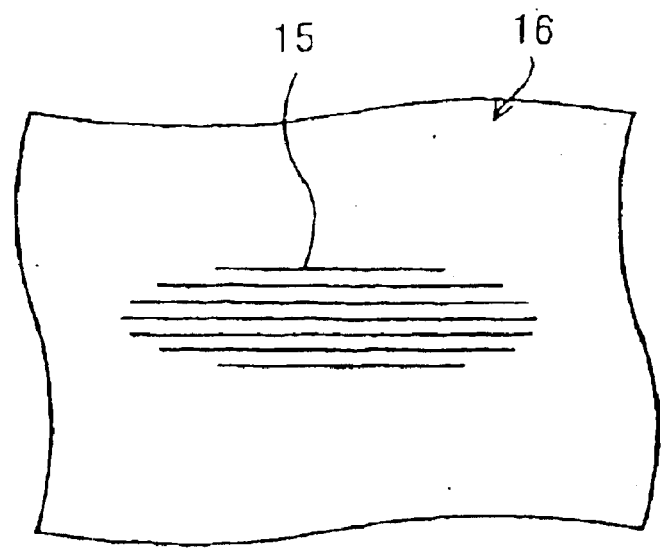
FIG. 17 is a schematic perspective view showing another process step for the production of the flat optical device according to Second Application Embodiment of the present invention.
Figure 17:
Figure 17:
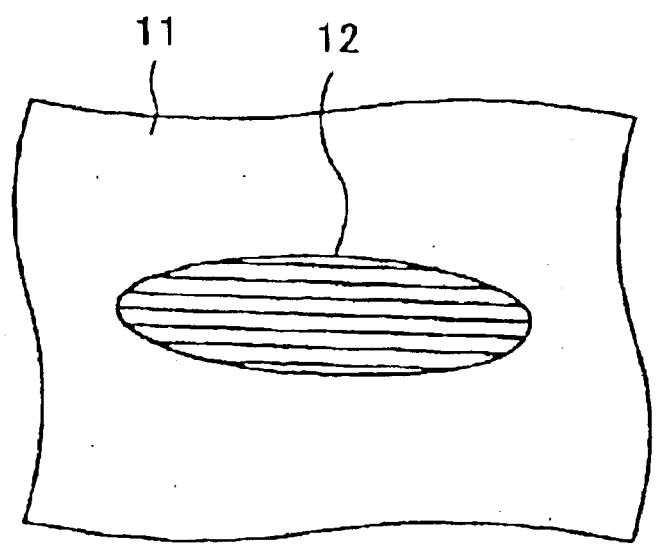

The green sheets 14 are then laminated in the thickness direction in such a manner that the centers of facing paste areas 15 coincide with each other to thereby form the lens unit 12 as the microlenses. The laminate is then compressed to integrate the green sheets 14 and thereby yields a green compact 16 comprising the integrated green sheets 14 as shown in FIG. 17. In the green compact 16, multi-layered paste areas 15 are arranged at a distance in parallel with each other in such a manner that an imaginary plane formed by connecting outer peripheries of the paste areas 15 is lenticular.

The green compact 16 is then embedded in a ceramic powder having the same composition with the ceramic material powder. The green compact 16 embedded in the ceramic powder is heated in a firing furnace in an atmosphere of the air to temperatures at which the organic binder disappear from the green compact 16. After removing the binder, oxygen is supplied to the firing furnace to an oxygen concentration higher than that in the air, while further elevating the temperature. While maintaining the resulting firing atmosphere, the inside temperature of the firing furnace is raised to a firing temperature of, for example, 1600° C., and the green compact 16 is fired for 20 hours while maintaining these firing temperature and firing atmosphere and thereby yields a sintered compact.

Figure 18:
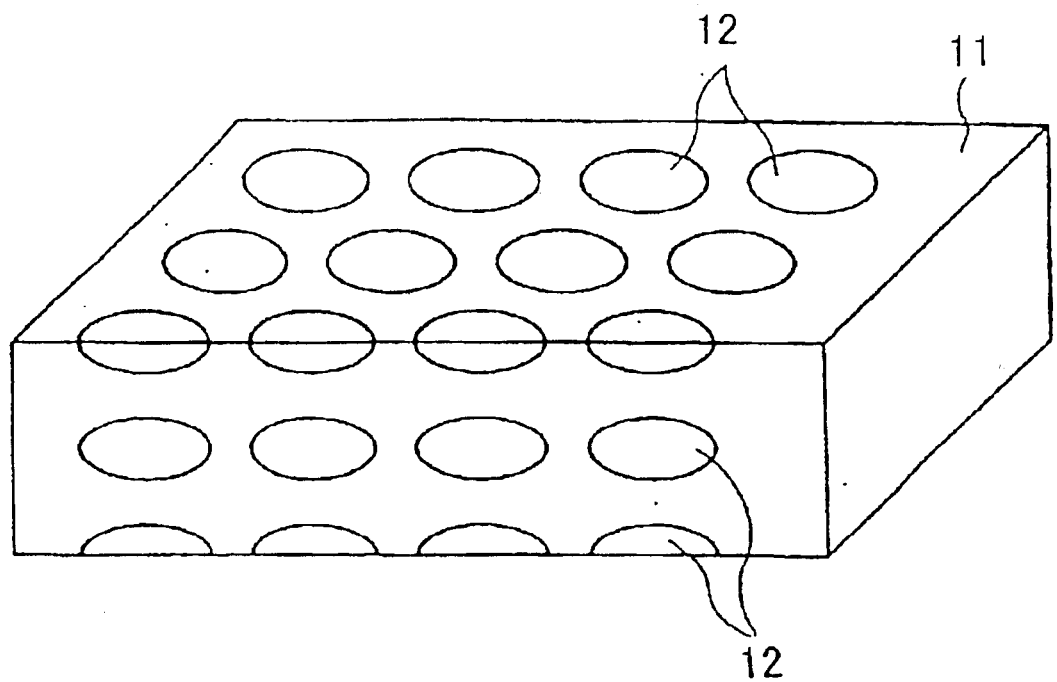
FIG. 18 is a schematic perspective view of the flat optical device according to Second Application Embodiment of the present invention.

With reference to FIGS. 17 and 18, the resulting article is a flat optical device comprising the substrate 11 and the lens units 12. The substrate 11 comprises a translucent ceramic containing, for example, a $Ba(Mg,Ta)O_3$ system composite perovskite crystal structure as a principle crystal phase. The lens units 12 are microlenses each having a diameter of from 1 mm$\phi$ to 8 mm$\phi$ and a thickness of from 20 $\mu$m to 150 $\mu$m and are formed by dispersion of $TiO_2$ in the aggregated past units 15.

Figure 19:
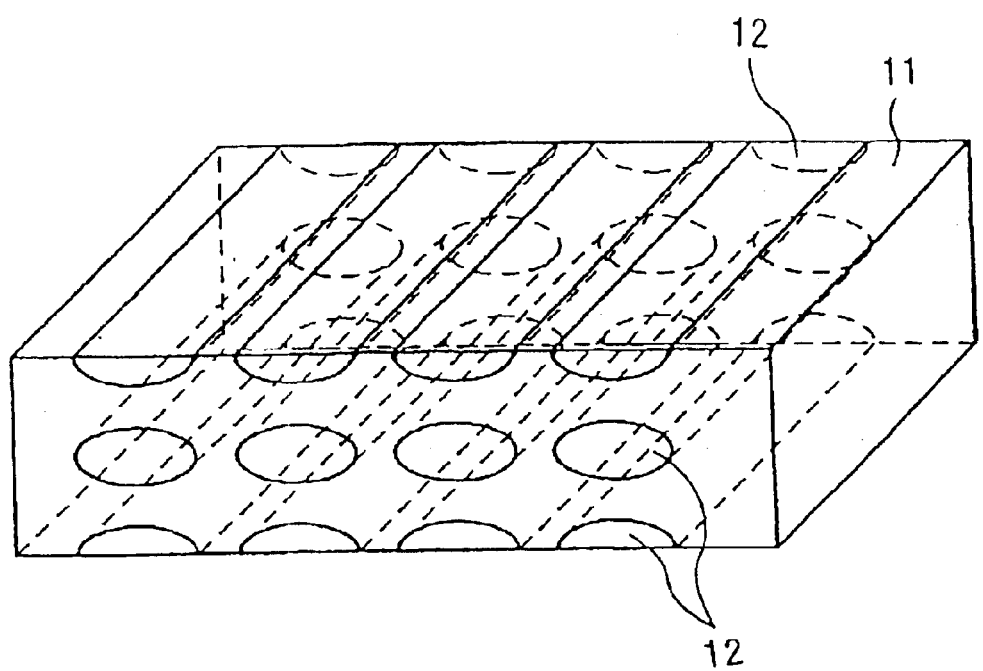
FIG. 19 is a schematic perspective view of another flat optical device according to Second Application Embodiment of the present invention.

With reference to FIG. 19, semicylindrical or roughly cylindrical lenticular lenses can be formed on the surface of or inside the substrate 11 as the lens units 12.

Figure 20:
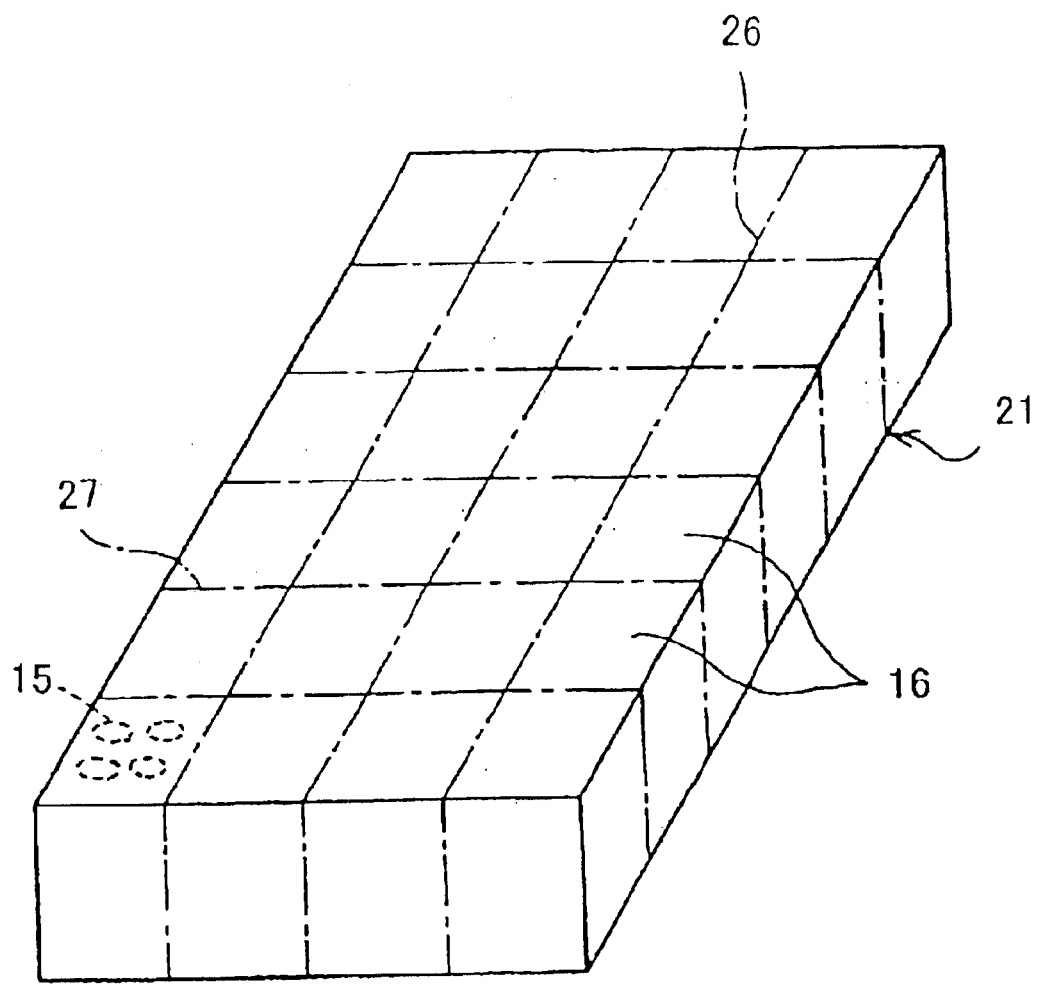
FIG. 20 is a schematic perspective view of yet another flat optical device according to Second Application Embodiment of the present invention.

In the above production process, the green compacts 16 for constituting the flat optical device are individually prepared. With reference to FIG. 20, the green compacts 16 may be prepared at once in the following manner. Specifically, plural paste areas 15 are formed on a large green sheet having an area larger than the green sheet 14, and plural plies of the large green sheet are laminated and are compressed in a thickness direction so that the paste areas 15 constitute the lens units 12 and thereby yields a laminated block 21. The laminated block 21 is then cut in a lamination direction along cutting lines 26 and 27 and thereby yields the green compacts 16.

The aforementioned flat optical device comprises a flat substrate composed of the translucent ceramic of the present invention and optical function units having a refractive index different from that of the substrate. Accordingly, biconvex lenses and other optical function units can easily be formed in the substrate, and their magnification and numerical apertures can easily be improved. In addition, optical function units including the dopant areas can stably be formed by preparing green sheets from the ceramic material powder, forming dopant areas containing a dopant for changing the refractive index on the surfaces of the green sheets, laminating the green sheets carrying the dopant areas and cofiring the resulting laminate to thereby integrate the green sheets and dopant areas.

Third Application Embodiment

Figure 21:
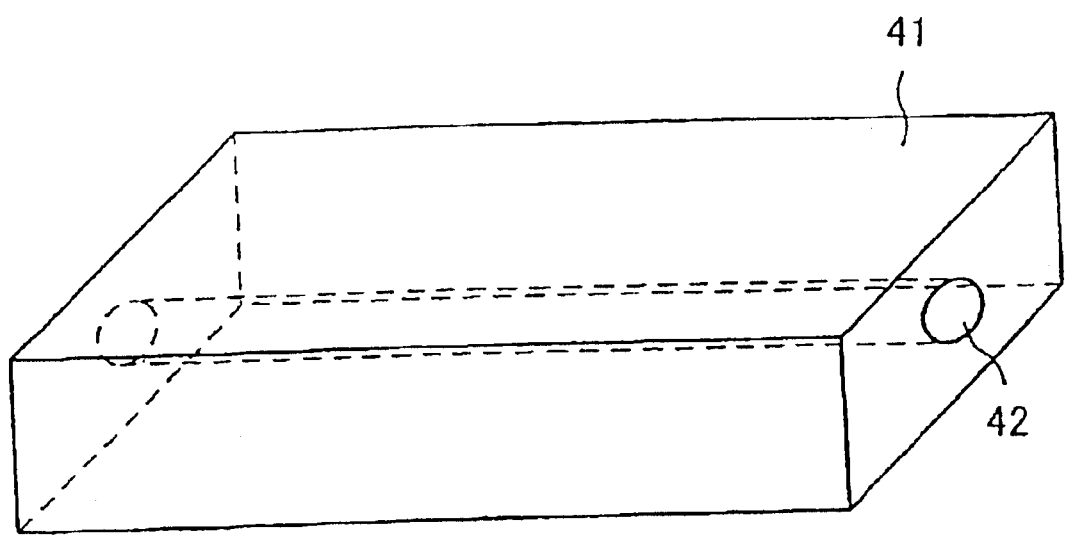
FIG. 21 is a schematic diagram of an optical waveguide according to Third Application Embodiment of the present invention.

With reference to FIG. 21, an optical waveguide according to the present embodiment comprises a cuboid substrate 41 and an optical waveguide unit 42 inside the substrate 41. The substrate 41 comprises the translucent ceramic of the present invention, and the optical waveguide unit 42 has a refractive index higher than that of the substrate 41. The periphery of the optical waveguide unit 42 with respect to the traveling direction of light is covered with the substrate 41. More specifically, the optical waveguide unit 42 is formed as a straight tube that can pass the light, and the periphery of the optical waveguide unit 42 is tightly covered with the substrate 41.

The optical waveguide unit 42 has a roughly round cross section in a direction perpendicular to its optical axis. The optical axis of the optical waveguide unit 42 is nearly in parallel with the outer periphery of the substrate 41. Both ends of the optical waveguide unit 42 in its longitudinal direction open at two ends of the substrate 41, respectively. When the light enters the optical waveguide unit from one opening, it can exit from the other. The cross section of the optical waveguide unit 42 is preferably roughly round from the viewpoint of transmission efficiency of the light but may be roughly rectangular.

The optical waveguide can be produced, for example, according to the following procedure.

Initially, the aforementioned ceramic material powder is prepared, is wet-milled in a ball mill with an organic binder for, for example, 16 hours and thereby yields a slurry. The slurry is molded into a sheet by a process such as doctor blade process and thereby yields a green sheet having a thickness of from about 10 µm to about 30 µm. The green sheet is then cut to rectangles 30 mm wide and 40 mm length, for example.

Figure 22:
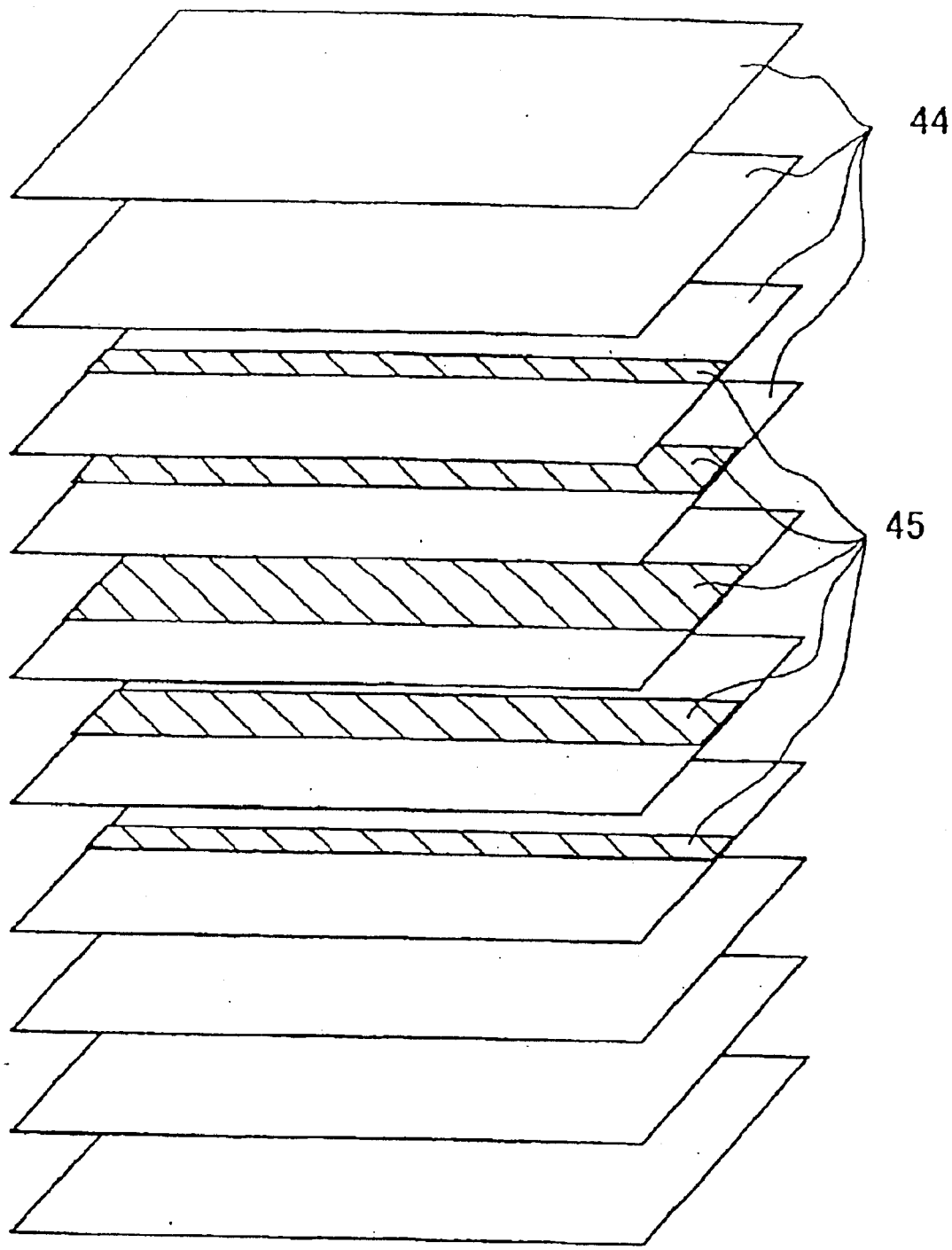
FIG. 22 is a schematic perspective view showing a process step for the production of the optical waveguide according to Third Application Embodiment of the present invention.

With reference to FIG. 22, roughly rectangle paste areas (dopant areas) 45 containing a dopant are formed on the surfaces of the individual green sheets 44 by printing or coating in such as to yield the optical waveguide unit 42. These paste areas 45 are formed by screen printing each of the paste areas 45 to a thickness less than that of the green sheet 44 (preferably, one fifth or less the thickness of the green sheet 44), for example, to a thickness of several micrometers and drying the printed paste areas 45.

An example of the pattern used herein is as follows. To form an optical waveguide unit 42 having a roughly round cross section, roughly rectangular individual paste areas 45 are formed on adjacent green sheets 44 in such a manner that the centerlines of the paste areas 45 in the longitudinal direction coincide with one another and the paste areas 45 each have a width sequentially increasing and then sequentially decreasing from the surface of the substrate 41. By forming this pattern, the dopant in the paste areas 45 diffuses during firing and thereby yields the optical waveguide unit 42 having a roughly round cross section.

Next, the patterned green sheets 44 and the green sheets 44 carrying no pattern are laminated in a thickness direction in such a manner as to form the optical waveguide unit 42, are compressed, are integrated and thereby yield a green compact 46 comprising the integrated green sheets 44. In the green compact 46, multilayer paste areas 45 are arranged at a distance in parallel with each other in such a manner that an imaginary plane formed by connecting outer peripheries of the paste areas 45 is lenticular.

The green compact 46 is then embedded in a ceramic powder having the same composition with the ceramic material powder. The green compact 46 embedded in the ceramic powder is heated in a firing furnace in an atmosphere of the air to temperatures at which the organic binder disappear from the green compact 46. After removing the binder, oxygen is supplied to the firing furnace to an oxygen concentration higher than that in the air, while further elevating the temperature. While maintaining the resulting firing atmosphere, the inside temperature of the firing furnace is raised to a firing temperature of, for example, 1600° C., and the green compact 46 is fired for 20 hours while maintaining these firing temperature and firing atmosphere and thereby yields a sintered compact.

Figure 23A:
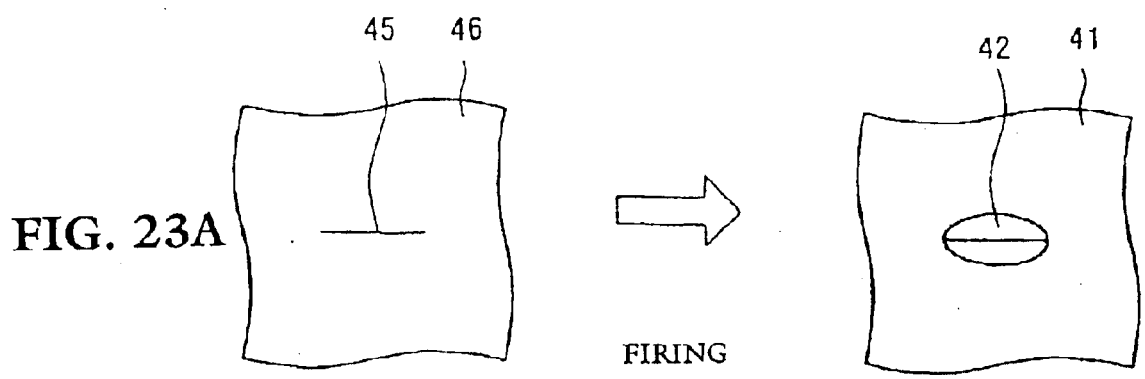
FIGS. 23A and 23B are schematic sectional views of another optical waveguide and of yet another optical waveguide, respectively, according to Third Application Embodiment of the present invention.
Figure 23B:
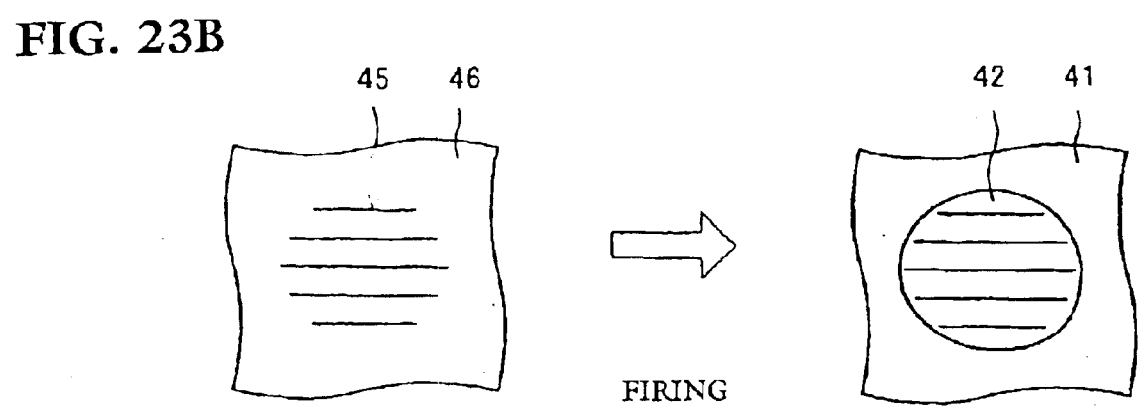

With reference to FIGS. 21 and 23B, the resulting optical waveguide comprises the substrate 41 and the optical waveguide unit 42. The substrate 41 comprises the translucent ceramic of the present invention, and the optical waveguide unit 42 has a cross sectional diameter of from about 0.1 mmφ to about 1 mmφ. The optical waveguide unit 41 can also be formed by using a single-layer paste area 45 as shown in FIG. 23A.

With reference to FIGS. 24A, 24B, and 24C, the optical waveguide unit 42 in the optical waveguide has a refractive index higher than that of the substrate 41 by action of the diffused dopant. More specifically, the refractive index of the optical waveguide unit 42 distributes so as to decrease sequentially and symmetrically from the center of the optical waveguide unit 42 to the outer periphery. Thus, the optical waveguide unit 42 has a "distributed refractive index". The light entered the optical waveguide unit 42 travels to a direction having a higher refractive index and thereby efficiently travels inside the optical waveguide unit 42 without leaking out of the optical waveguide unit 42.

The optical waveguide can also be used as an optical delay element due to high refractive index of the optical waveguide unit 42 and can be miniaturized since it has a high transmittance and a high refractive index. In addition, the optical waveguide unit 42 is formed inside the substrate 41, and the periphery of the optical waveguide unit 42 is completely and tightly covered with the substrate 41. The optical waveguide can therefore avoid loss in light due to partial exposure of an optical waveguide unit or light scattering loss due to a rough surface of the exposed surface of such an optical waveguide unit. The optical waveguide can thereby transmit the light with an improved efficiency.

Figure 25:
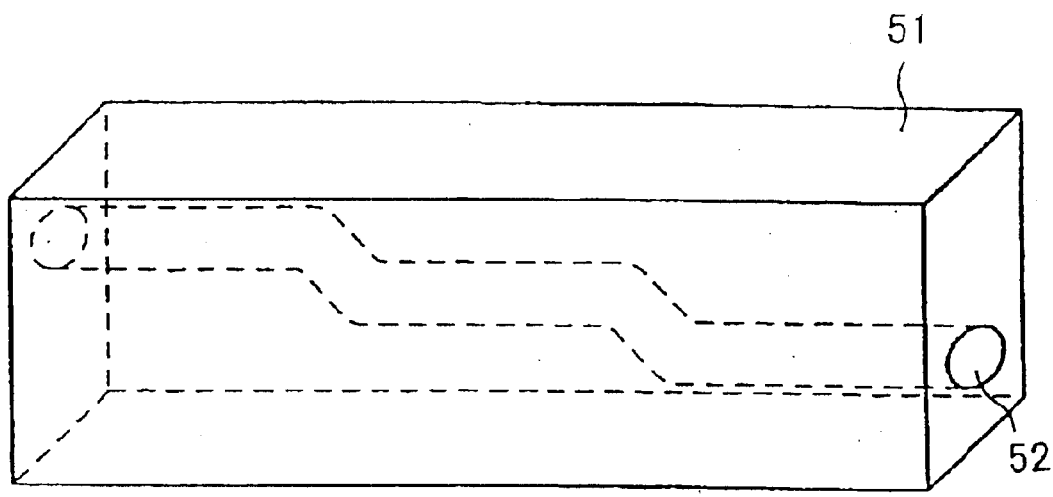
FIG. 25 is a schematic perspective view of another optical waveguide according to Third Application Embodiment of the present invention.

A modification will be illustrated below. In the modification, an optical waveguide unit is formed, for example, in a zigzag form so as to change the course of light travelling in an optical waveguide unit 52 as shown in FIG. 25.

Initially, a process of producing the optical waveguide comprising the optical waveguide unit 52 will be illustrated with reference to FIG. 26.

Figure 26:
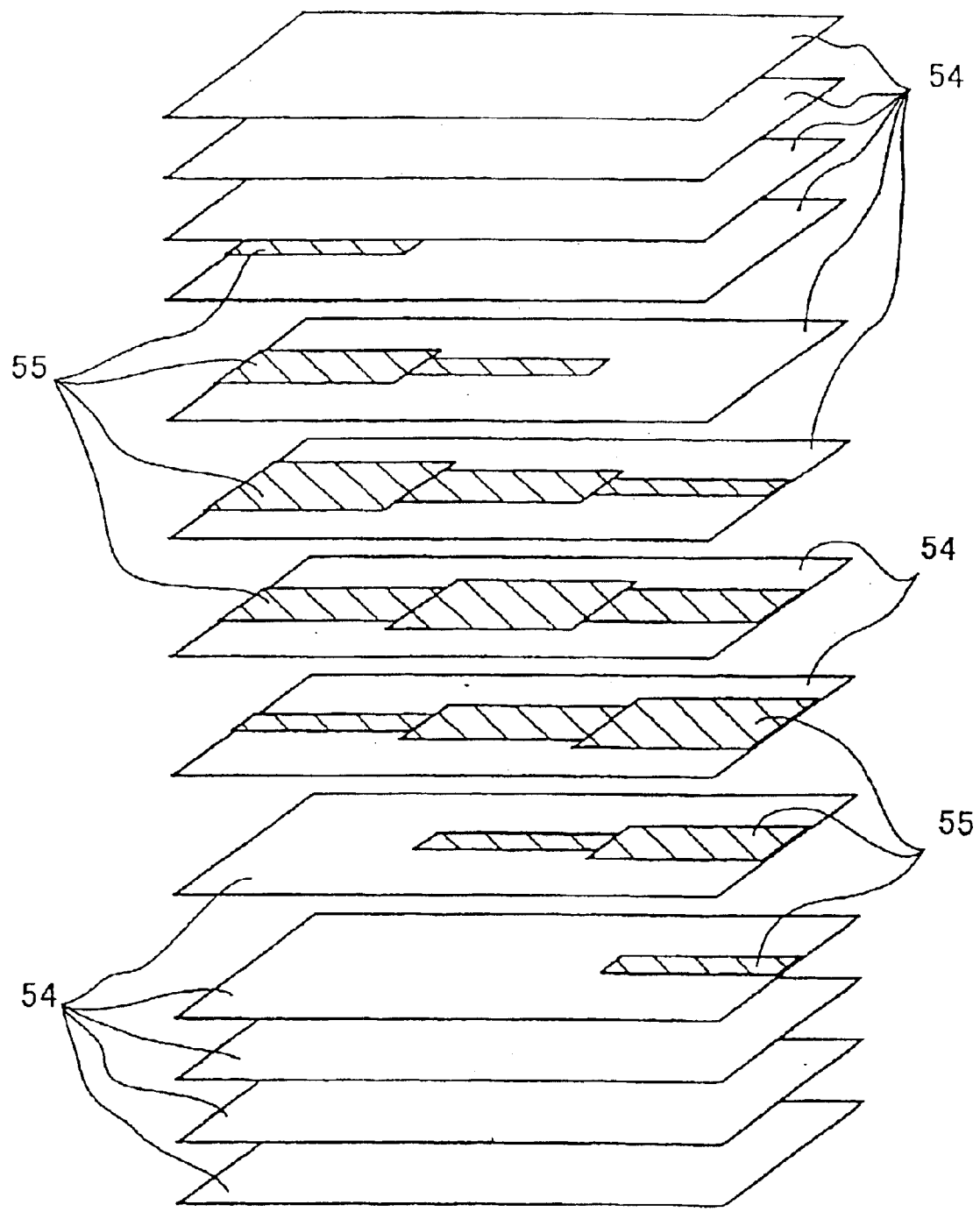
FIG. 26 is a schematic perspective view showing a process step for the production of another optical waveguide according to Third Application Embodiment of the present invention.

As shown in FIG. 26, paste areas 55 are formed on green sheets 54 in such a manner that individual paste areas 55 on adjacent green sheets 54 partially face with each other and shift relative to each other in a surface direction and/or a thickness direction of the green sheets 54. The green sheets 54 are then laminated, are fired and thereby yield the optical waveguide unit 52 for example in a zigzag form in the substrate 51 to change the course of the light traveling in the optical waveguide unit 52.

Specifically, the optical waveguide comprises the substrate 51 and the optical waveguide unit 52 integrally formed and does not require control such as the registration of the optical waveguide unit 52 even when the course of the light in the optical waveguide unit should be changed. This configuration can simply select the course of the light and can simplify the production of an optical waveguide comprising the optical waveguide unit 52. It is also acceptable that the optical waveguide unit 52 is inclined with respect to the side of the substrate 51.

The above embodiments have been illustrated by taking Ti as an example of the dopant. Similar advantages as above can be obtained by using at least one element selected from the titanium group elements other than Ti, vanadium group elements, iron groups elements, platinum group elements, and rare earth elements.

The optical waveguide comprises the substrate composed of the translucent ceramic and the optical waveguide unit having a refractive index higher than that of the substrate, and the periphery of the optical waveguide unit with respect to the course of the light in the optical waveguide unit is covered with the substrate. Accordingly, the optical waveguide can transmit the light with an improved efficiency and can easily be produced.

Fourth Application Embodiment

Figure 27:
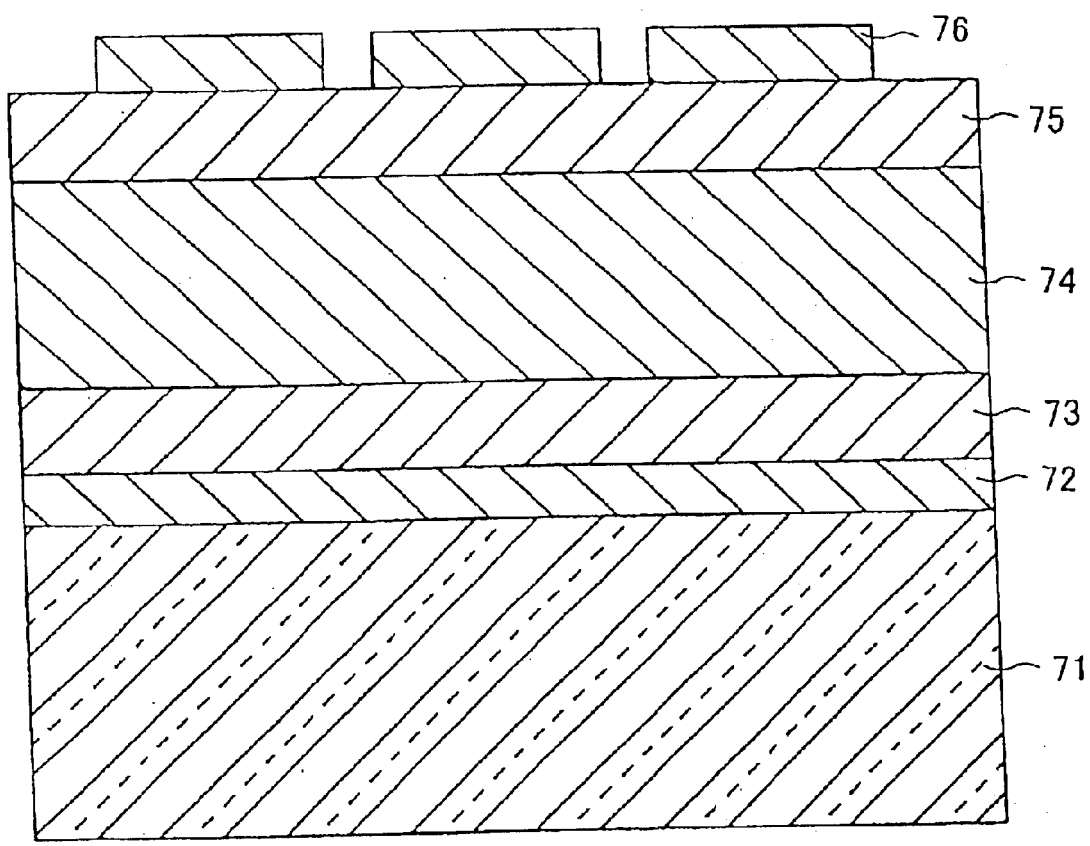
FIG. 27 is a schematic sectional view of an electroluminescent element according to Fourth Application Embodiment of the present invention.

With reference to FIG. 27, an electroluminescent element according to the present embodiment comprises a plate substrate 71 composed of the translucent ceramic of the present invention. The plate substrate 71 has, for example, a surface roughness Ra of 0.005 μm and a surface imperfection area of 0.1%.

A transparent electrode layer 72 made of, for example, ITO (indium tin oxide) 200 nm thick is formed on the substrate 71 by a process such as sputtering. The transparent electrode layer 72 constitutes a common electrode layer. On the transparent electrode layer 72 are formed a lower insulating layer 73, a luminescent layer 74, and an upper insulating layer 75 in this order. As the lower insulating layer 73, a multilayer film can be used. The multilayer film comprises a thin film mainly containing silicon oxide and having a thickness of 50 nm, and a thin film mainly containing silicon nitride and having a thickness of 200 nm, for example. As the upper insulating layer 75, another multilayer film can be used. The multilayer film comprises a thin film mainly containing silicon nitride and having a thickness of 200 nm, and a thin film mainly containing silicon oxide and having a thickness of 50 nm, for example.

A luminescent base material for the luminescent layer 74 includes, for example, strontium sulfide (SrS). A luminescent unit of the luminescent layer 74 can be formed by, for example, applying cerium sulfide ($Ce_2S_3$) to the substrate 71 by electron beam vapor deposition to a thickness of 0.8 μm to 1.8 μm. The luminescent layer 74 is preferably annealed, for example, at 600° C. in vacuo for about 2 hours in order to improve the crystallinity of the luminescent layer 74, to distribute the luminescent unit further uniformly to thereby increase the luminescent efficiency.

Stripe aluminium electrodes as back plates 76 are formed, by photolithography, on the upper insulating layer 75 at predetermined intervals in parallel with one another. The back plates 76 constitute scanning electrodes for displaying images. Thus, a thin-film electroluminescent element can be obtained.

The electroluminescent element comprises the substrate 71 composed of the translucent ceramic of the present invention and thereby invites almost no delamination or cracking in the luminescent layer 74 even if the thickness of the luminescent layer 74 varies. Upon the formation of the constitutional thin films, no defect such as a break occurs. This is because the aforementioned translucent ceramics each have a thermal expansion coefficient of from $10\times10^{-6}/°$ C. to $11\times10^{-6}/°$ C. which is near to the thermal expansion coefficient of the luminescent layer 74 made of SrS, $11\times10^{-6}/°$ C. to $14\times10^{-6}/°$ C., and thereby a mismatch in thermal expansion coefficient between the luminescent layer 74 and the substrate 71 can be avoided.

In addition, the electroluminescent element can be produced without using expensive materials for the substrate, such as single crystalline $SrTiO_3$, can have optical properties equivalent to those using the expensive materials, and does not require processes using expensive apparatus, such as hot pressing (HP) and hot isostatic pressing (HIP).

The electroluminescent element comprises the substrate and the luminescent unit, which substrate is composed of the translucent ceramic of the present invention, and which luminescent unit is formed on the substrate between the transparent common electrode layer and the scanning electrode layer. The substrate comprises the translucent polycrystal, and the luminescent layer formed thereon can be treated at high temperatures to thereby increase the luminescent efficiency of the luminescent layer.

Fifth Application Embodiment

Figure 28:
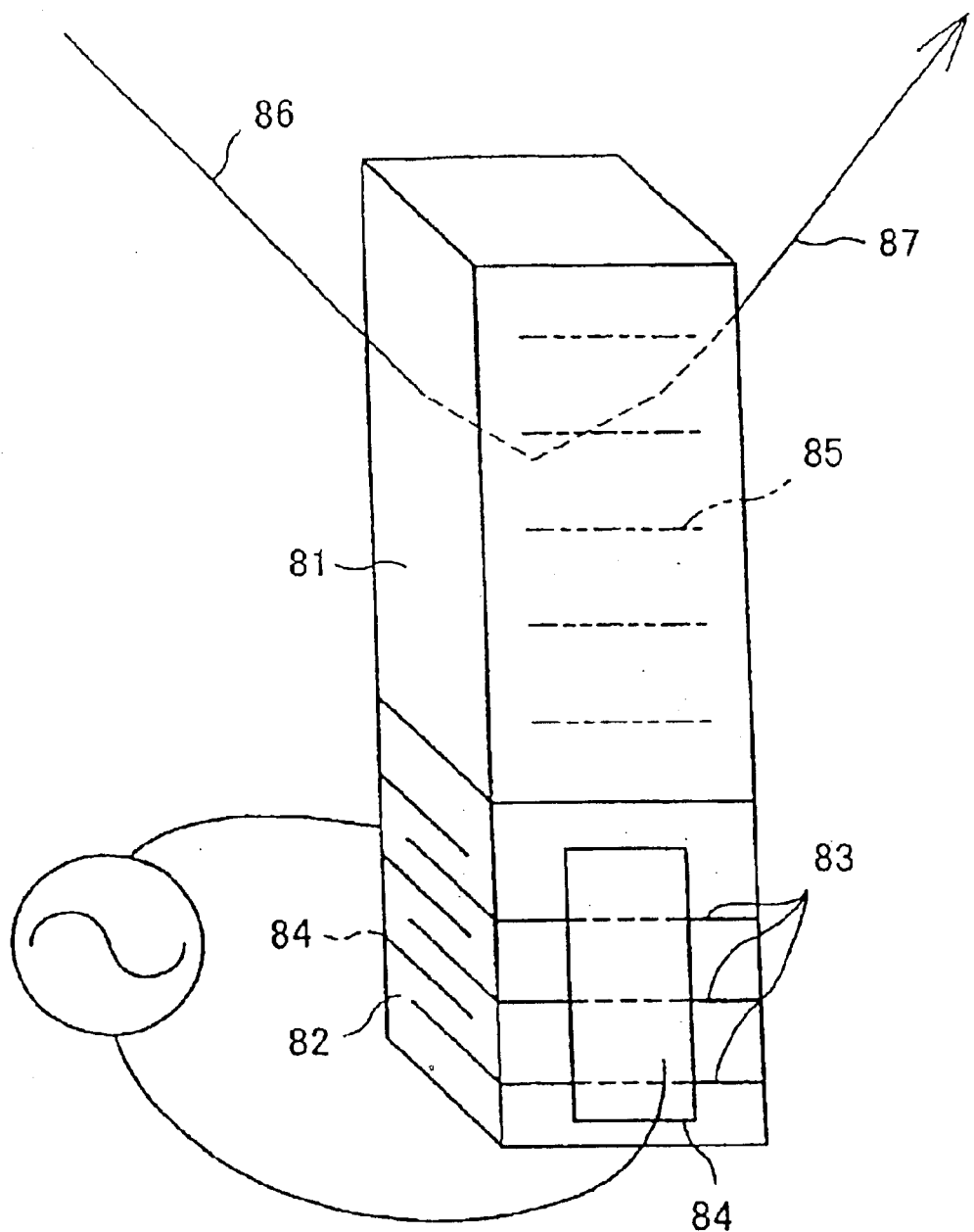
FIG. 28 is a schematic sectional view of an acoustooptic device according to Fifth Application Embodiment of the present invention.

With reference to FIG. 28, an acoustooptic device according to the present embodiment includes an acoustooptic medium 81 and an ultrasonic oscillator 82. The acoustooptic medium 81 comprises the translucent ceramic of the present invention and is roughly rectangular parallelepiped (e.g., quadrangular prism). The ultrasonic oscillator 82 comprises a piezoelectric ceramic and is roughly rectangular parallelepiped (e.g., quadrangular prism) having the same cross sectional area with that of the acoustooptic medium 81 and is formed coaxially at an end of the acoustooptic medium 81 in its longitudinal direction. The acoustooptic medium 81 and the ultrasonic oscillator 82 are flush with each other in their peripheral surfaces.

The acoustooptic device includes inner electrodes 83 to allow the ultrasonic oscillator 82 to generate ultrasonic waves. The inner electrodes 83 sandwich a ply of the piezoelectric ceramic in such a manner that one edge of each inner electrode is exposed to the outside and that two adjacent inner electrodes have exposed edges in a staggered configuration. The acoustooptic device also includes a pair of outer electrodes 84 for supplying electric power (electric energy) to the inner electrodes. While not shown in the figure, ultrasonic wave absorbers made of, for example, an elastic substance may be formed at edges where the inner electrodes 83 are formed in order to prevent reflection of the ultrasonic waves at the edges.

In the acoustooptic device, the acoustooptic medium 81 and the ultrasonic oscillator 82 are integrally formed by cofiring.

The acoustooptic device includes the inner electrodes 83 having exposed edges in a staggered configuration. By supplying predetermined electric energy from the outer electrodes 84 to the inner electrodes 83, the ultrasonic oscillator 82 generates ultrasonic waves, and the ultrasonic waves 85 can propagate via the ultrasonic oscillator 82 to the acoustooptic medium 81 along its longitudinal direction. The acoustooptic medium 81 is attached to the ultrasonic oscillator 82.

The propagated ultrasonic waves 85 change the refractive index of the acoustooptic medium 81 to thereby yield an artificial diffraction grating in the acoustooptic medium 81. When light 86 enters the acoustooptic medium 81 in a direction inclined to the propagation direction of the ultrasonic waves 85, the light 86 can be diffracted to thereby yield diffracted light 87 including primary light and secondary light. The diffracted light 87 can be applied to optical devices such as bifocal lenses.

In addition, according to the aforementioned configuration, the acoustooptic medium 81 comprising the translucent ceramic of the present invention and the ultrasonic oscillator 82 comprising a piezoelectric ceramic can be integrally formed and attached by cofiring. Accordingly, the acoustooptic medium 81 and the ultrasonic oscillator 82 are attached (bonded) with an improved strength.

The acoustooptic device can be produced, for example, by the following process.

Figure 29:
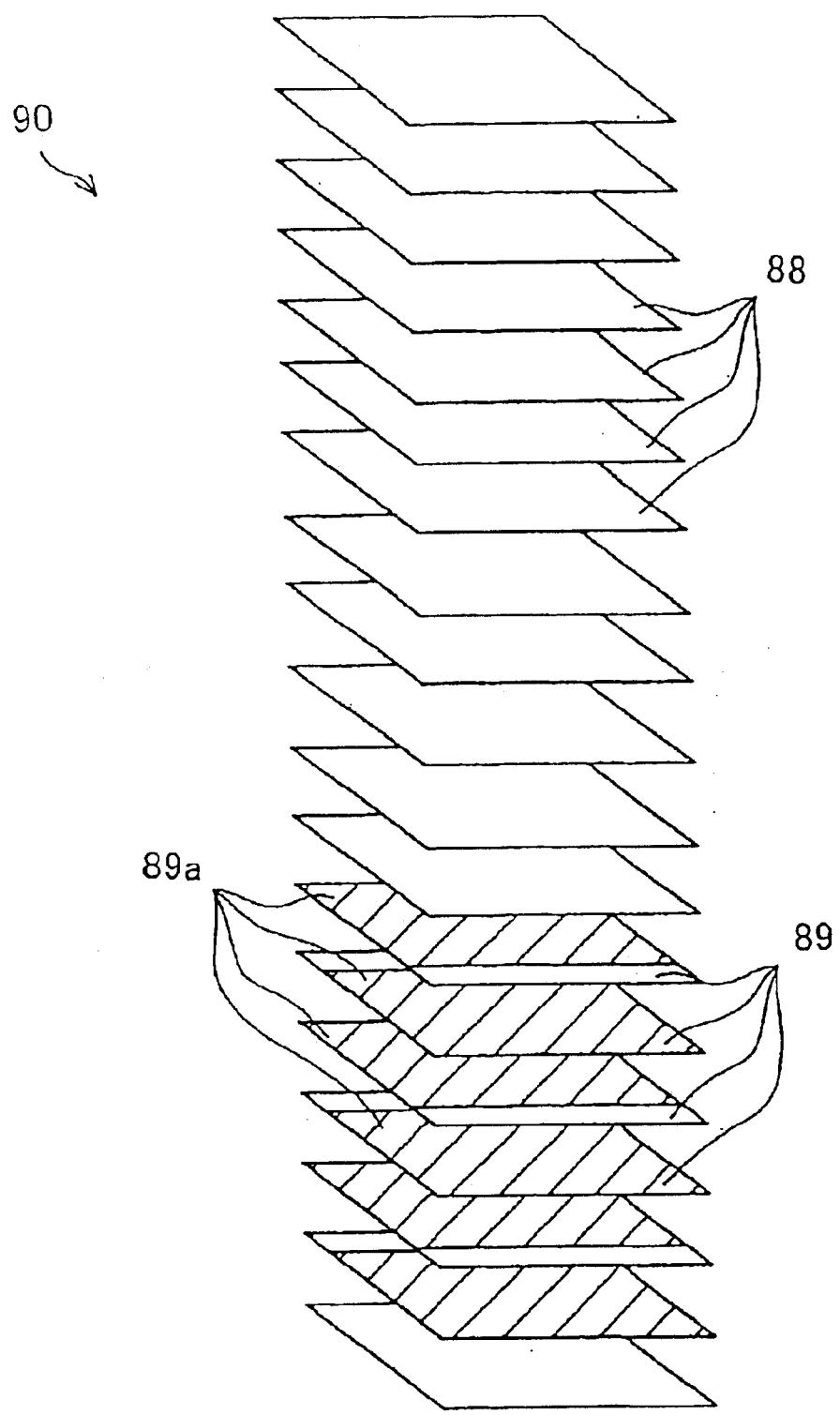
FIG. 29 is a schematic sectional view showing a process step for the production of the acoustooptic device according to Fifth Application Embodiment of the present invention.

Initially, the aforementioned ceramic material powder is prepared, is wet-milled in a ball mill with an organic binder for, for example, 16 hours and thereby yields a slurry. The slurry is molded into a sheet by a process such as doctor blade process and thereby yields a green sheet having a thickness of from about 20 μm to about 100 μm. The green sheet is then cut to rectangles 30 mm wide and 40 mm length, for example and thereby yields first green sheets 88, as shown in FIG. 29.

Separately, a slurry mainly containing a barium titanate piezoelectric ceramic material powder is prepared. The slurry is molded into a sheet by a process such as doctor blade process and thereby yields a green sheet having a thickness of from about 20 μm to about 100 μm. The green sheet is then cut to rectangles having same dimensions as in the first green sheets and thereby yields second green sheets 89 for the formation of the ultrasonic oscillator 82.

A platinum paste is then applied to the surfaces of the green sheets 89 to a thickness of about several micrometers by screen printing, is dried and thereby yields inner electrode paste areas 89a to constitute the inner electrode 83. The inner electrode paste areas 89a can be formed by screen printing the paste to a thickness less than that of the second green sheets 99 (preferably, one fifth or less the thickness of the second green sheets 89), for example, to a thickness of several micrometers and drying the printed paste.

In this procedure, the inner electrode paste areas 89a are formed so as to reach three sides of the second green sheets 89. At the remaining one side, the inner electrode paste is not applied so as to remain a space having a width about one tenth the length of the side of the second green sheets 89. Specifically, the inner electrode paste areas 89a to constitute the inner electrodes 83 are formed on the surfaces of the second green sheets 89 excluding the vicinity of one side thereof.

Next, the first green sheets 88 and the second green sheets 89 are laminated in a thickness direction, are compressed and thereby yield a composite laminate 90.

Figure 30:
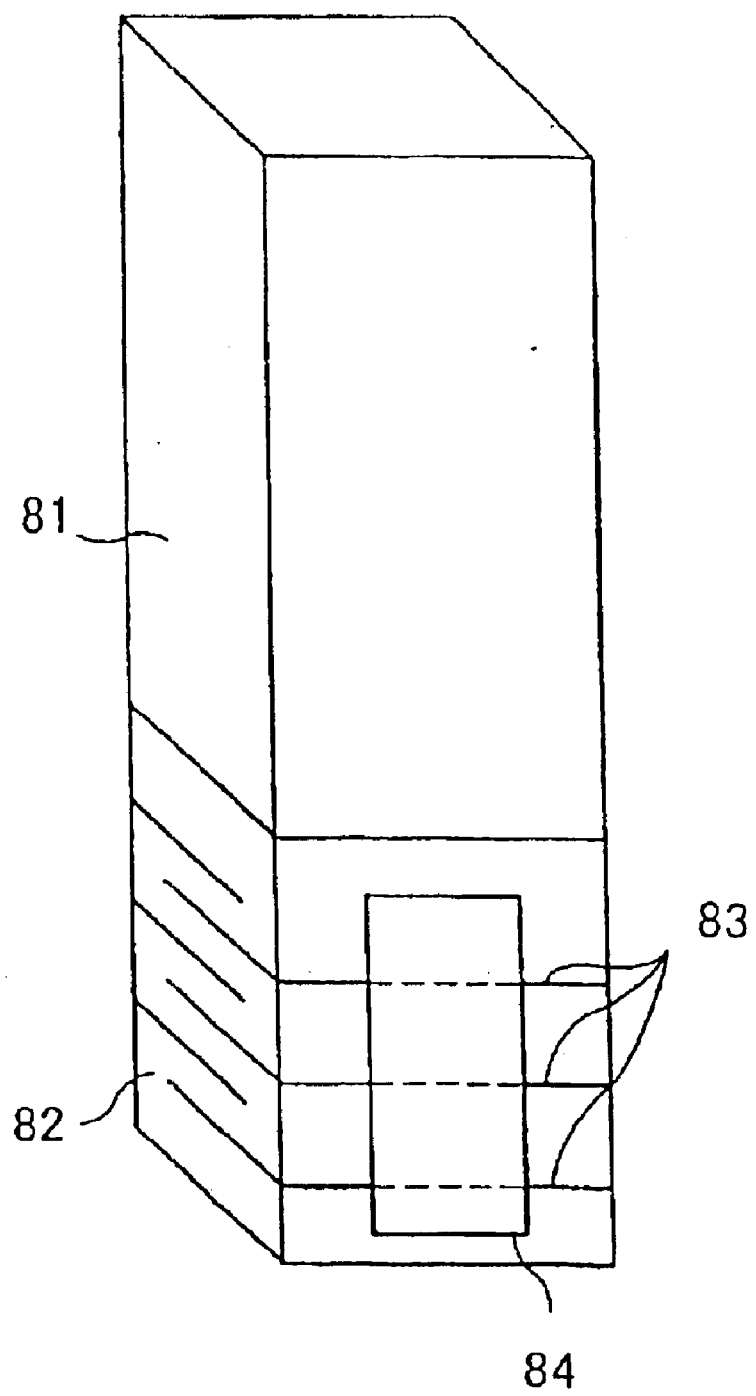
FIG. 30 is a schematic sectional view showing another process step for the production of the acoustooptic device according to Fifth Application Embodiment of the present invention.

The composite laminate 90 is then embedded in a ceramic powder having the same composition with the ceramic material powder for constituting the first green sheets. The composite laminate 90 embedded in the ceramic powder is heated in a firing furnace in an atmosphere of the air to temperatures at which the organic binder disappear from the green compact 46. After removing the binder, oxygen is supplied to the firing furnace to an oxygen concentration higher than that in the air, while further elevating the temperature. While maintaining the resulting firing atmosphere, the inside temperature of the firing furnace is raised to a firing temperature of, for example, 1600° C., and the composite laminate 90 is fired for 20 hours while maintaining these firing temperature and firing atmosphere and thereby yields a sintered compact. The outer electrodes 84 are then formed on the two sides of the sintered compact as shown in FIG. 30, for example, by baking a silver (Ag) paste. The outer electrodes 84 serve to supply electric energy to the inner electrodes 83 exposed to the two sides.

The resulting acoustooptic device, in which the ultrasonic oscillator 82 generates ultrasonic waves with longitudinal vibration, can transform electricity to mechanical motions with an increased efficiency and can be miniaturized due to a high refractive index of the acoustooptic medium. In addition, the acoustooptic medium 81 and ultrasonic oscillator 82 in the acoustooptic device are integrally formed and are bonded with increased strength to thereby improve the durability of the resulting acoustooptic device.

The aforementioned acoustooptic device comprises the acoustooptic medium composed of the translucent ceramic of the present invention, the ultrasonic oscillator attached to the acoustooptic medium and composed of a piezoelectric ceramic, and the inner electrodes, and these components are integrally formed by cofiring. In the acoustooptic device, therefore, the acoustooptic medium and the ultrasonic oscillator are bonded with each other with an increased strength.

Sixth Application Embodiment

Figure 31:
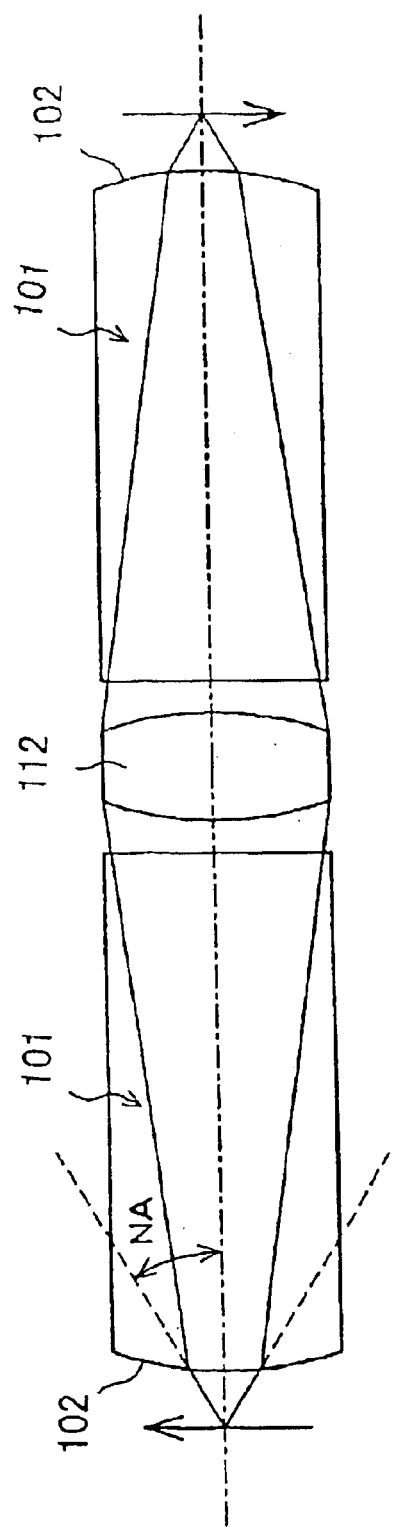
FIG. 31 is a schematic side view of a rod lens according to Sixth Application Embodiment of the present invention.

With reference to FIG. 31, a rod lens according to the present embodiment includes a roughly columnar (preferably cylindrical) base 101 comprising the translucent ceramic of the present invention. The rod lens further includes outwardly convex lens units 102 formed respectively at both edges (edges in a longitudinal direction) of the base 101. The lens parts 102 have spherical surface, have center axes nearly coincident with the central axis of the base 101 and have vertexes positioning on the central axis of the base 101.

The base 101 herein is a polycrystalline paraelectric exhibiting no double refraction, and the resulting rod lens can be produced without consideration given to the direction of a crystal axis and can thereby easily be produced, in contrast to a rod lens using a material exhibiting double refraction, such as single crystalline $LiNbO_3$.

When the rod lens is used, for example, as a relay lens system in combination with a concave lens 112 in an endoscope as shown in FIG. 31, the rod lens comprising the base 101 having a refractive index of equal to or more than 1.9 can thereby increase the brightness of the relay lens system and can improve an image quality. The rod lens has been illustrated by taking the outwardly convex lens unit 102 as an example, but the lens units 102 can be concave lenses.

The rod lens of the present embodiment includes the base composed of the translucent ceramic of the present invention, and the lens unit(s) formed at one or both edges of the base in its longitudinal direction, and the base is a translucent polycrystalline paraelectric. Accordingly, the rod lens can highly freely be designed regardless of the crystal axis direction. Specifically, the rod lens comprises the base having a refractive index of equal to or more than 1.9 and can thereby increase the brightness and the image quality obtained by an endoscope when it is used in a relay lens system in the endoscope, as compared with a relay lens system using glass and other similar materials.

INDUSTRIAL APPLICABILITY

As thus described, the translucent ceramic of the present invention has a refractive index of equal to or more than 1.9 and is paraelectric, and when it is used as a lens, prism or another optical part of an optical device such as an optical pickup, the resulting optical device can have improved optical properties and can be miniaturized.

What is claimed is:

1. A translucent ceramic having a refractive in index of equal to or more than 1.9 and being paraelectric and comprising a perovskite crystal phase.

2. The translucent ceramic according to claim 1, comprising a polycrystalline oxide as a principle crystal phase, the polycrystalline oxide comprising a perovskite crystal phase represented by the formula: $ABO_3$ wherein A is an A-site element in the perovskite crystal phase; and B is a B-site element in the perovskite crystal phase.

3. The translucent ceramic according to claim 2, wherein the perovskite crystal phase represented by the formula: $ABO_3$ comprises barium as the A-site element, and magnesium and tantalum as the B-site elements.

4. The translucent ceramic according to claim 3, wherein the perovskite crystal phase further comprises tin and zirconium as the B-site elements.

5. The translucent ceramic according to claim 3, wherein the perovskite crystal phase is represented by $$Ba\{(Sn_uZr_{1-u})_xMg_yTa_z\}_vO_w \qquad \text{Formula I:}$$

wherein x+y+z=1, 0≦u≦1.00, 1.00≦v≦1.05; w is arbitrary; and x, y, and z lie within the range enclosed by Point A (x=0.40, y=0.23, z=0.37), Point B (x=0, y=0.39, z=0.61), Point C (x=0, y=0.27, z=0.73), and Point D (x=0.40, y=0.11, z=0.49), excluding the line between Point A and Point B.

6. The translucent ceramic according to claim 5, wherein x, y, and z in Formula I lie within the range enclosed by Point E (x=0.400, y=0.210, z=0.390), Point F (x=0.125, y=0.325, z=0.550), Point G (x=0.125, y=0.290, z=0.585), and Point H (x=0.400, y=0.170, z=0.430).

7. The translucent ceramic according to claim 2, wherein the perovskite crystal phase represented by the formula: $ABO_3$ comprises barium as the A-site element, and zinc and tantalum as the B-site elements.

8. The translucent ceramic according to claim 7, wherein the perovskite crystal phase further comprises zirconium as the B-site element.

9. The translucent ceramic according to claim 8, wherein the perovskite crystal phase is represented by $$Ba(Zr_xZn_yTa_z)_vO_w \qquad \text{Formula II:}$$

wherein x+y+z=1, $1.00 \leq v \leq 1.050$; w is arbitrary; and x, y, and z in Formula I lie within the range enclosed by Point A (x=0.01, y=0.29, z=0.70), Point B (x=0.06, y=0.29, z=0.65), Point C (x=0.06, y=0.36, z=0.58), and Point D (x=0.01, y=0.36, z=0.63).

10. The translucent ceramic according to claim 9, wherein x, y, and z in Formula II lie within the range enclosed by Point E (x=0.020, y=0.300, z=0.680), Point F (x=0.050, y=0.300, z=0.650), Point G (x=0.050, y=0.350, z=0.600), and Point H (x=0.020, y=0.350, z=0.630).

11. The translucent ceramic according to claim 2, wherein the perovskite crystal phase represented by the formula: $ABO_3$ comprises barium as the A-site element and, magnesium and niobium as the B-site elements.

12. The translucent ceramic according to claim 11, wherein the perovskite crystal phase further comprises tin, zirconium and zinc as the B-site elements.

13. The translucent ceramic according to claim 2, wherein the perovskite crystal phase is represented by $$Ba\{(Sn_uZr_{1-u})_x(Zn_tMg_{1-t})_yNb_2\}_vO_w \qquad \text{Formula III:}$$

wherein x+y+z=1, $0 \leq t \leq 1.00$, $0 \leq u \leq 1.00$, $1.00 \leq v \leq 1.450$; w is arbitrary; and x, y, and z lie within the range enclosed by Point A (x=0.25, y=0.35, z=0.40), Point B (x=0, y=0.35, z=0.65), Point C (x=0, y=0.20, z=0.80), Point D (x=0.10, y=0.10, z=0.80), Point (x=0.55, y=0.10, z=0.35), Point F (x=0.35, y=0.30, z=0.35), and Point G (x=0.30, y=0.30, z=0.40).

14. The translucent ceramic according to claim 13, wherein x, y, and z in Formula III lie within the range enclosed by Point H (x=0.250, y=0.300, z=0.450), Point I (x=0.050, y=0.300, z=0.650), Point J (x=0.150, y=0.200, z=0.650), and Point K (x=0.350, y=0.200, z=0.450).

15. The translucent ceramic according to claim 11, further comprising at least one metallic element selected from the group consisting of iron, cobalt, and nickel in an amount less than or equal to 1.2% by mole based on the amount of the polycrystalline oxide.

16. The translucent ceramic according to claim 11, having a linear transmittance with respect to visible light of equal to or more than 20%.

17. The translucent ceramic according to claim 14, having a linear transmittance with respect to visible light of equal to or more than 50%.

18. The translucent ceramic according to claim 11, having a refractive index of equal to or more than 2.0.

19. The translucent ceramic according to claim 2, wherein the polycrystalline oxide is free of lead.

20. An optical device including an optical part utilizing the translucent ceramic as claimed in claim 1 as the optical part.

21. The optical device according to claim 20 wherein the optical part comprising the translucent ceramic is a lens.

22. The optical device according to claim 21, wherein the optical device is an optical pickup and the lens is an objective lens facing a recording medium.

23. The optical device according to claim 20, comprising a flat optical device comprising a flat substrate and an optical functional unit, the flat substrate comprising the translucent ceramic, and the optical functional unit disposed on the flat substrate and having a refractive index different from that of the flat substrate.

24. The optical device according to claim 23 wherein the optical functional unit comprises at least one element selected from the group consisting of elements of the titanium group, vanadium group, iron group, and platinum group, and rare earth elements as a dopant, whereby the optical functional unit has a different refractive index with respect to the flat substrate comprising the translucent ceramic.

25. The optical device according to claim 20, comprising a substrate and an optical waveguide unit and constituting an optical waveguide, the substrate comprising the translucent ceramic, and the optical waveguide unit having a refractive index higher than that of the substrate, the periphery of the optical waveguide unit with respect to a traveling direction of light being covered with the substrate comprising the translucent ceramic.

26. The optical device according to claim 25 wherein the optical waveguide unit is formed so as to change the travelling direction of light which travels in the optical waveguide unit.

27. The optical device according to claim 26 wherein the optical waveguide unit comprises at least one element selected from the group consisting of elements of the titanium group, vanadium group, iron group, and platinum group, and rare earth elements as a dopant, whereby the optical functional unit has a different refractive index with respect to the substrate comprising the translucent ceramic.

28. The optical device according to claim 20, comprising a substrate, a luminescent unit, a common electrode and a scanning electrode and constituting an electroluminescent element, the substrate comprising the translucent ceramic, the luminescent unit formed on the substrate and comprising a luminescent layer emitting light by electroluminescence, and the common electrode and the scanning electrode sandwiching the light emitting unit.

29. The optical device according to claim 28 wherein the luminescent layer comprises a sulfide of an alkaline earth metal as a base material.

30. The optical device according to claim 20, comprising an acoustooptic medium and an ultrasonic oscillator and constituting an acoustooptic device, the acoustooptic medium comprising the translucent ceramic, and the ultrasonic oscillator formed adjacent to the acoustooptic medium and comprising a piezoelectric ceramic.

31. The optical device according to claim 30, further comprising inner electrodes and outer electrodes, the inner electrodes formed in the ultrasonic oscillator and serving to supply electric energy to the piezoelectric ceramic, and the outer electrodes being connected to the inner electrodes.

32. The optical device according to claim 31 wherein the acoustooptic medium and the ultrasonic oscillator are integrally molded by cofiring.

33. The optical device according to claim 20, comprising a base and a lens unit and constituting a rod lens, the base comprising the translucent ceramic, and the lens unit formed at an edge in the longitudinal direction of the base.

34. The optical device according to claim 25 wherein the optical waveguide unit comprises at least one element selected from the group consisting of elements of the titanium group, vanadium group, iron group, and platinum group, and rare earth elements as a dopant, whereby the optical functional unit has a different refractive index with respect to the substrate comprising the translucent ceramic.

35. The optical device according to claim 20, wherein the translucent ceramic comprising a polycrystalline oxide as a principle crystal phase, the polycrystalline oxide comprising a perovskite crystal phase represented by the formula: $ABO_3$ wherein A is an A-site element in the perovskite crystal phase and B is a B-site element in the perovskite crystal phase.

36. The optical device according to claim 35, wherein the A-site element comprises barium and the B-site element comprises at least one of magnesium, tantalum, and zinc.

37. The optical device according to claim 35, wherein the perovskite crystal phase further comprises at least one of tin, zirconium, zinc, niobium and zirconium as the B-site elements.

38. The optical device according to claim 35, wherein the perovskite crystal phase is represented by Formula I, Formula II or Formula III, wherein $$Ba\{(Sn_uZr_{1-u})_xMg_yTa_z\}_vO_w \qquad \text{Formula I:}$$

wherein x+y+z=1, 0≦u≦1.00, 1.00≦v≦1.05; w is a number which ionically balances the formula; and x, y, and z lie within the range enclosed by Point A (x=0.40, y=0.23, z=0.37), Point B (x=0, y=0.39, z=0.61), Point C (x=0, y=0.27, z=0.73), and Point D (x=0.40, y=0.11, z=0.49), excluding the line between Point A and Pont B;

$$Ba(Zr_xZn_yTa_z)_vO_w \qquad \text{Formula II:}$$

wherein x+y+z=1, 1.00≦v≦1.050; w is arbitrary; and x, y, and z in Formula I lie within the range enclosed by Point A (x=0.01, y=0.29, z=0.70), Point B (x=0.06, y=0.29, z=0.65), Point C (x=0.06, y=0.36, z=0.58), and Point D (x=0.01, y=0.36, z=0.63); and $$Ba\{(Sn_uZr_{1-u})_x(Zn_tMg_{1-t})_yNb_z\}_vO_w \qquad \text{Formula III:}$$

wherein x+y+z=1, 0≦t≦1.00, 0≦u≦1.00, 1.00≦v1.450; w is arbitrary; and x, y, and z lie within the range enclosed by Point A (x=0.25, y=0.35, z=0.40), Point B (x=0, y=0.35, z=0.65), Point C (x=0, y=0.20, z=0.80), Point D (x=0.10, y=0.10, z=0.80), Point E (x=0.55, y=0.10, z=0.35), Point F (x=0.35, y=0.30, z=0.35), and Point G (x=0.30, y=0.30, z=0.40).

39. The optical device according to claim 38, wherein x, y, and z in Formula I lie within the range enclosed by Point E (x=0.400, y=0.21 , z=0.390), Point F (x=0.125, y=0.325, z=0.550), Point G (x=0.125, y=0.290, z=0.585), and Point H (x=0.400, y=0.170, z=0.430);

in Formula II lie within the range enclosed by Point E (x=0.020, y=0.300, z=0.680), Point F (x=0.050, y=0.300, z=0.650), Point G (x=0.050, y=0.350, z=0.600), and Point H (x=0.020, y=0.350, z=0.630); and in Formula III lie within the range enclosed by Point H (x=0.250, y=0.300, z=0.450), Point I (x=0.050, y=0.300, z=0.650), Point J (x=0.150, y=0.200, z=0.650), and Point K(x=0.350, y=0.200, z=0.450).

40. The optical device according to claim 39, wherein the translucent ceramic has a linear transmittance with respect to visible light of equal to or more than 50%.

41. The optical device according to claim 35, wherein the translucent ceramic further comprising at least one metallic element selected from the group consisting of iron, cobalt, and nickel in an amount less than or equal to 1.2% by mole based on the amount of the polycrystalline oxide.

42. The optical device according to claim 35, wherein the translucent ceramic has a linear transmittance with respect to visible light of equal to or more than 20%.

43. The optical device according to claim 35, wherein the translucent ceramic has a refractive index of equal to or more than 2.0.

44. The optical device according to claim 34, wherein the polycrystalline oxide is free of lead.

* * * * *

UNITED STATES PATENT AND TRADEMARK OFFICE
CERTIFICATE OF CORRECTION

PATENT NO. : 6,908,872 B2
DATED : June 21, 2005
INVENTOR(S) : Nobuhiko Tanaka et al.

It is certified that error appears in the above-identified patent and that said Letters Patent is hereby corrected as shown below:

Title page,
Item [30], Foreign Application Priority Data, should read
-- Dec. 26, 2000 (JP) ........................ 2000-395522
  Dec. 26, 2000 (JP) ........................ 2000-395545
  Dec. 27, 2000 (JP) ........................ 2000-398730
  Dec. 27, 2000 (JP) ........................ 2000-398757
  Dec. 27, 2000 (JP) ........................ 2000-398779
  Nov. 20, 2001 (JP) ........................ 2001-355097 --.

Signed and Sealed this

Thirtieth Day of August, 2005

JON W. DUDAS
*Director of the United States Patent and Trademark Office*